United States Patent [19]

Isola

[11] 3,953,067

[45] Apr. 27, 1976

[54] VEHICLE HEADLINER CONSTRUCTION

[76] Inventor: Richard A. Isola, 6748 Leslee Crest Drive, West Bloomfield, Mich. 48033

[22] Filed: Sept. 18, 1974

[21] Appl. No.: 507,369

[52] U.S. Cl. ............................................. 296/137 A
[51] Int. Cl.² ............................................ B60J 7/10
[58] Field of Search .............. 296/137 A; 428/10 L, 428/137; 156/211, 226, 227

[56] References Cited
UNITED STATES PATENTS

| 2,674,488 | 4/1954 | Lyjynen | 296/137 A |
| 3,042,446 | 7/1962 | Stahl | 296/137 A |
| 3,300,357 | 1/1967 | Doerfling | 296/137 A X |

Primary Examiner—Robert R. Song
Attorney, Agent, or Firm—Harness, Dickey & Pierce

[57] ABSTRACT

A vehicle headliner construction adapted to be mounted adjacent the underside of a vehicle roof and extend laterally between the longitudinal side edges of the roof and longitudinally between the front and rear edges of the roof, the headliner comprising at least one sheet or panel of a relatively rigid, but foldable material having an elongated reversely folded portion serving to rigidify and strengthen the headliner and provide a seam appearing line on the side of the headliner confronting the interior of the vehicle. In an alternative construction, the headliner may comprise two or more headliner sections or panels the adjacent edges of which are joined in a manner providing a seam line similar in appearance to the line provided by the reversely folded portion(s). The headliner may be either self-supporting or associated with support elements which cooperate with the folded portion and/or joined edges of adjacent headliner sections for supporting the headliner in its operative position within a vehicle.

212 Claims, 36 Drawing Figures

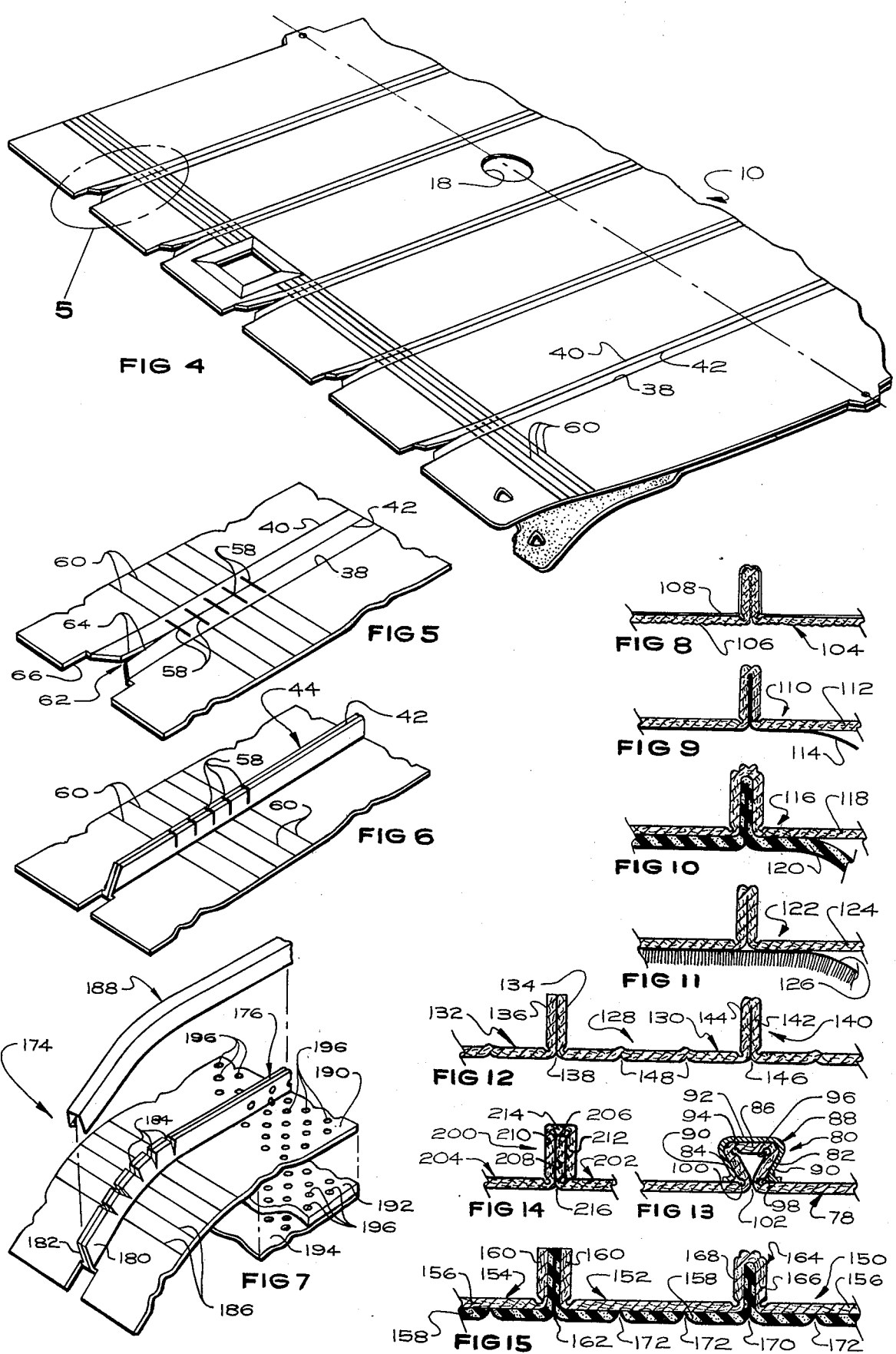

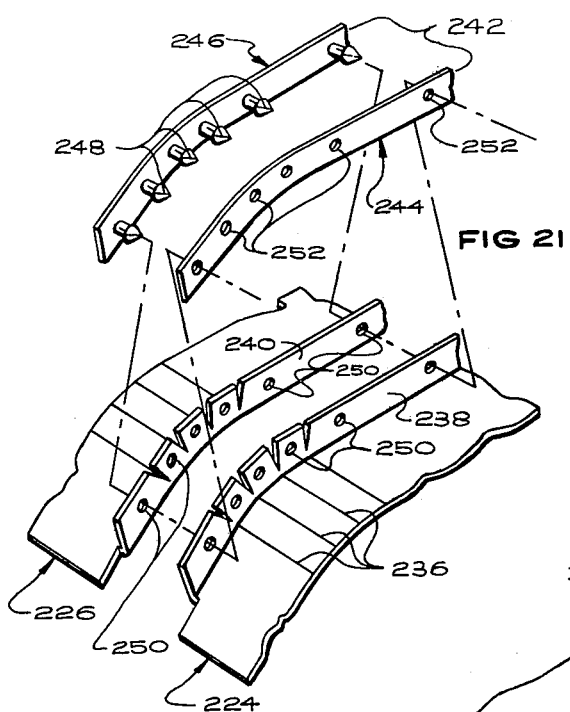
FIG 21
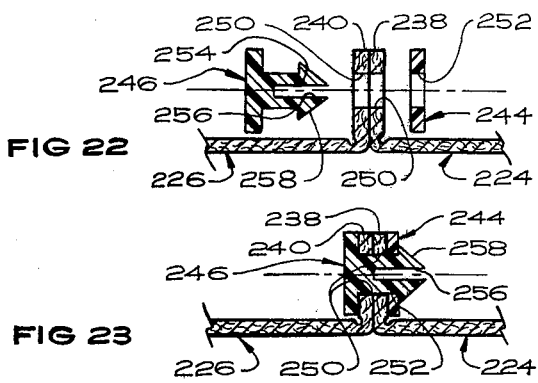
FIG 22
FIG 23
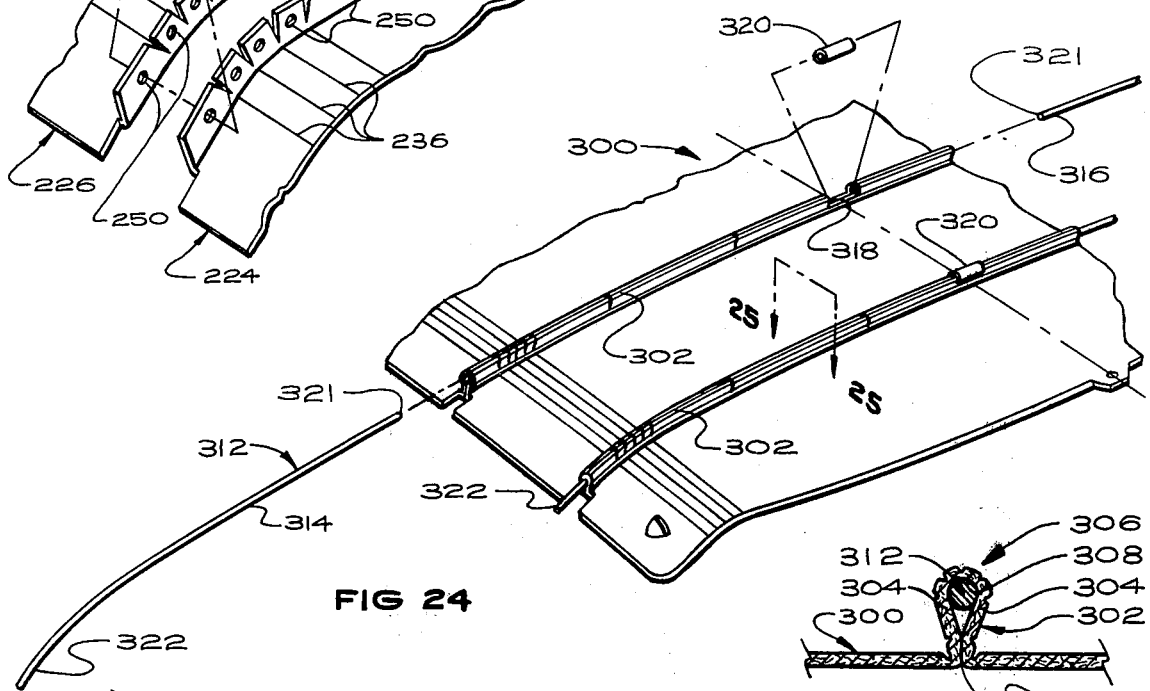
FIG 24
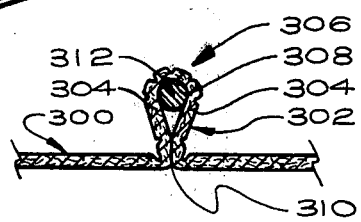
FIG 25
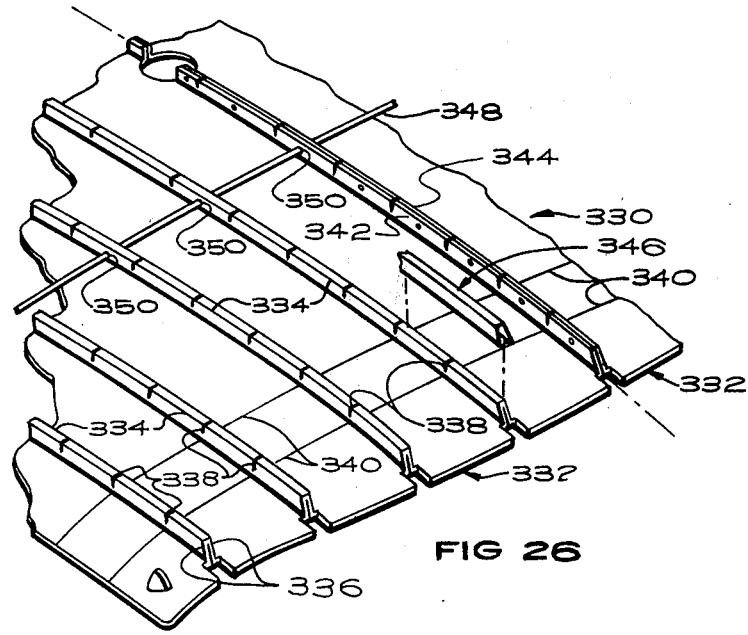
FIG 26
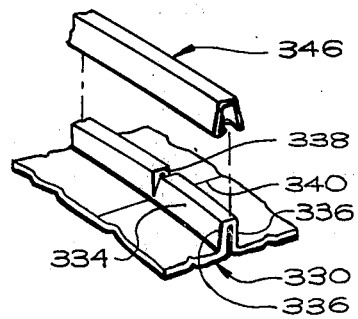
FIG 27

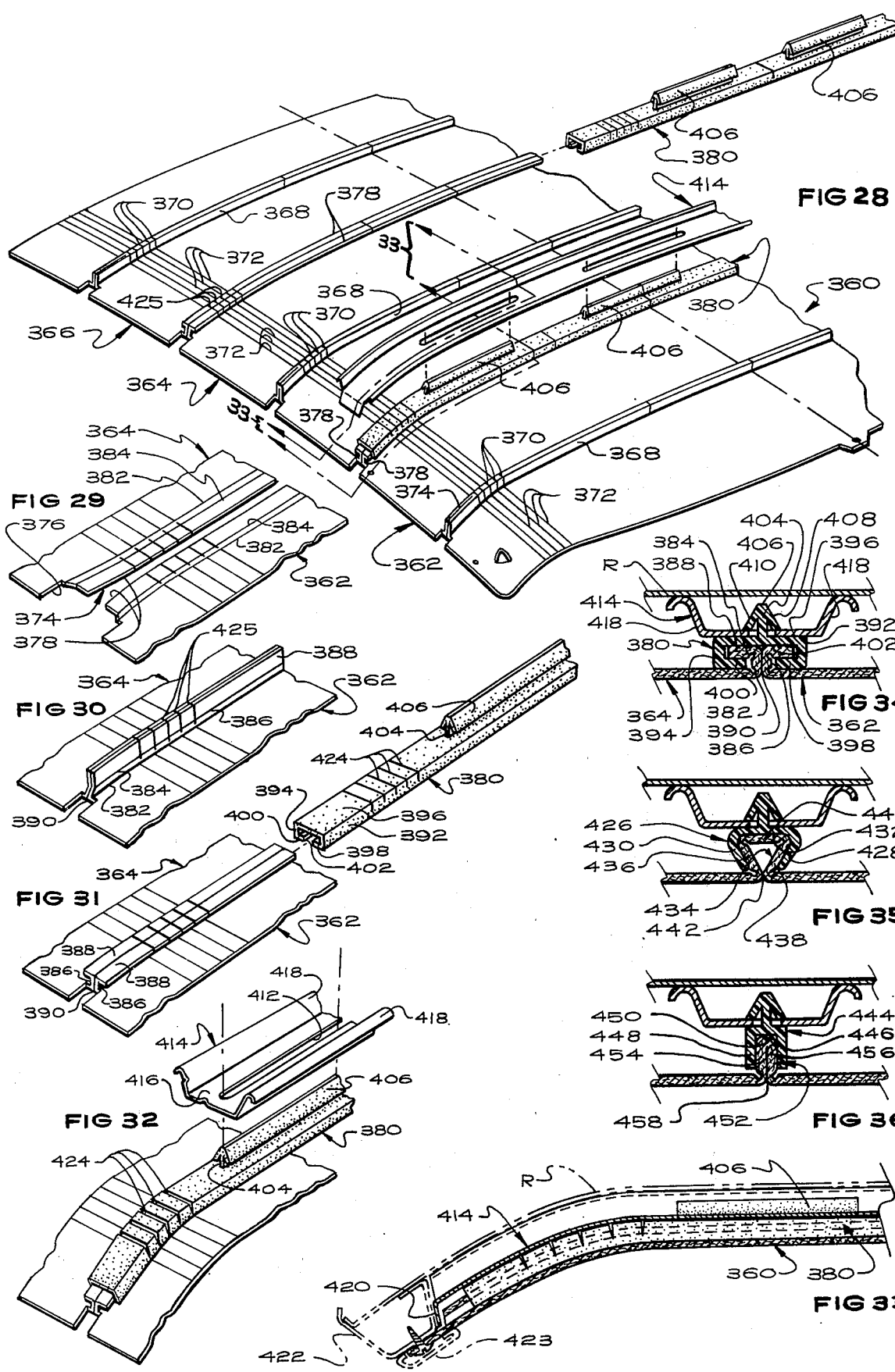

VEHICLE HEADLINER CONSTRUCTION

BACKGROUND OF THE INVENTION

As is well known in the art, it is desirable to provide an attractive and durable interior headliner for use in covering the underside of a vehicle roof. It is important, of course, that such headliners be of low cost and be relatively simple to manufacture and convenient to install. It has heretofore been the practice to utilize three basic types of headliner constructions, the first of which is referred to in the industry as a "cut-and-sewn" headliner, and comprises a plurality of sections of suitable woven, knitted or supported vinyl fabric that are sewn together at longitudinally spaced increments and secured to a series of laterally extending listing wires or plastic bows which, on assembly, are secured to the upper edges of the roof in a manner such that the fabric can be tensioned to conform with the general contour of the roof. Typically, cut-and-sewn headliners are fabricated at automobile trim plants by highly skilled labor. The second type of headliner construction that has found significant acceptance and use is of a relatively rigid molded construction and retained in place through the use of trim moldings and the like. Such molded headliners have typically been fabricated of molded fiberglas and molded hardboard and have been of the "one-piect" or integral design.

Each of the above types of headliner constructions exhibit a number of advantageous and desirable features, although the designs heretofore known and used have also been subject to objectionable criticism. For example, cut-and-sewn headliners have been found to be highly acceptable from a weight and appearance standpoint, but are highly susceptible to being torn or ripped. Cut-and-sewn headlinders are also advantageous because a wide variety of materials can be used so as to provide variations in grade, quality, etc. More importantly, however, because it is necessary to use highly skilled workers to fabricate and install cut-and-sewn headliners, there is a significant labor expense factor involved. One additional problem with cut-and-sewn headlinders results when fabric sections of mismatched colors, textures or dye lots, etc., are combined during assembly of the headliners. Also, cut-and-sewn headliners frequently require a time consuming steaming operation to remove wrinkles in the fabric after installation thereof.

Fiberglas molded headliners have heretofore been fabricated with a fiberglas batt substrate having a woven fiberglas covering medium, both of which are simultaneously molded in a high temperature environment. Because of such high temperature conditions, the variety of different types of covering medium has been extremely limited to those materials that will accept the high molding temperatures, namely glass cloth. Molded fiberglas headliners exhibit acceptable heat and sound insulating characteristics, although they have been found to be quite brittle and hence highly susceptible to fracture during handling. Another objection resides in the fact that fiberglas headliners, like molded hardboard headliners, require costly tooling. Additionally, such headliners, while being fairly lightweight, have a relatively hard surface confronting the interior of the vehicle and hence poor tactile quality.

In some instances, it is necessary to install one-piece molded headliners through the windshield or backlite openings in a vehicle body and hence before either the windshield or backlite of the vehicle have been assembled. This procedure, however, has been found to be repugnant to certain manufacturers, particularly where the established manufacturing techniques call for the vehicle body to have all windows installed and completely water tested, i.e., subjected to high pressure water sprays, etc., before any interior soft trim components are placed within the passenger compartment. Additionally, some types of one-piece headliners heretofore known and currently used have been found to be aesthetically objectionable due to the existence of exposed raw edges and fold lines.

Molded hardboard headliners are most commonly fabricated with perforations which facilitate forming, with a suitable covering medium, usually foam backed vinyl, being provided on the underside of the headliner. While molded hardboard headliners provide reasonably good sound absorbing qualities, production tooling is extremely costly, as previously mentioned, and the resultant product has been found to be objectionably heavy and highly susceptible to breakage. Lower cost versions of molded hardboard headliners eliminate the use of the covering medium, with the underside thereof being suitably textured and colored, resulting in a product having poor sound absorbing qualities.

The third and final type of headliner construction heretofore known and used is of the one-piece bent or curved construction which is usually fabricated of a hardboard-like material. Typically, however, this type of headliner consists of multiple layers of kraft paper and polyethylene on the opposite sides of a Styrofoam core. Certain higher quality versions utilize perforated foam backed vinyl or a knapped tricot knitted fabric so as to exhibit better tactile and sound absorbing qualities. In its least expensive form, one-piece bent headliners have poor aesthetic and sound absorbing qualities, although being relatively inexpensive and lightweight. The main objection to such type headliners resides in the fact that raw die cut edges are exposed, as are certain score lines, which give the appearance similar to that of looking into a large box. To those skilled in the art, the most desirable features of such one-piece bent headliners reside in the low cost of manufacture, low tooling costs and ease of installation.

The present invention provides a new and improved headliner construction which is intended to overcome the objectionable characteristics of each of the aforedescribed types of headliners heretofore known and used. More particularly, the present invention provides a novel headliner construction that has the custom tailored appearance of cut-and-sewn headliners, but which eliminates the myriad of problems associated with the installing and fitting of cut-and-sewn headliners. Moreover, the headliner construction of the present invention can be installed within a vehicle passenger compartment even after the vehicle windshield and backlite have been assembled. The headliner of the present invention will also be found to be entirely self-supporting so as to obviate the many objections relating to the use of listing wires and the like, although where desired, ancillary supporting means can be employed without in any way detracting from the other advantageous features of the headliner design. Additionally, a variety of covering mediums can be used so as to provide for universality of application, although where extremely low cost is desired, the headliner material per se may be textured and/or colored and thus not require a decorative covering medium. An additional feature of the present invention resides in the fact that the headliner may be installed in multiple sections when desired and will exhibit significant weight savings over certain types of molded headliners heretofore known and used.

SUMMARY OF THE INVENTION

This invention relates generally to vehicle headliners and more particularly to a new and improved headliner construction intended to overcome the many disadvantages and objectionable features of cut-and-sewn headliners and molded headliners of the prior art.

It is accordingly a general object of the present invention to provide a new and improved headliner construction.

It is a more particular object of the present invention to provide a headliner construction that has the custom tailored appearance of a cut-and-sewn headliner, but which eliminates the many problems of assembly and fitting associated with cut-and-sewn headliners.

It is another object of the present invention to provide a new and improved headliner construction that may be provided with a variety of covering mediums which can be applied before or after fabrication of the headliner.

It is still another object of the present invention to provide a headliner construction of the above-described type that can be installed in one or more sections and which can be folded for installation in vehicles where the access opening is smaller than the overall headliner dimensions. It is a related object of the present invention to provide a headliner that can be installed in a vehicle after the vehicle glass has been assembled.

It is a further object of the present invention to provide a headliner construction that can be manufactured with low cost tooling, that is of a relatively lightweight construction as compared to some previously used molded headliners, and which can be either self-supporting or supported where desired.

It is still a further object of the present invention to provide a new and improved headliner construction that is extremely durable and will thus have a long and effective operational life.

It is yet another object of the present invention to provide a new and improved headliner that can be economically fabricated to be aesthetically appealing, can be installed in a minimum amount of time by unskilled labor, and will exhibit maximum flexibility as to fabrication and installation methods.

Other objects and advantages of the present invention will become apparent from the following detailed description taken in conjunction with the accompanying drawings.

BRIEF DESCRIPTION OF THE DRAWINGS

FIG. 4 is a fragmentary elevated perspective view of a headliner construction similar to that shown in FIGS. 1 and 2 and is depicted in a substantially pre-formed configuration;

FIG. 5 is an enlarged fragmentary elevated perspective view of the structure shown within the elipse 5 of FIG 4;

FIG. 6 is a view similar to FIG. 5 and discloses the foldable portion thereof in a fully folded configuration;

FIG. 7 is an elevated perspective view of a structure similar to that shown in FIGS. 5 and 6, which structure is depicted in operative association with one preferred embodiment of a fold retaining element;

FIG. 8 is a fragmentary cross-sectional view of a folded portion of one preferred embodiment of the headliner construction of the present invention as it would appear when fabricated with a moisture barrier;

FIG. 9 is a fragmentary cross-sectional view similar to FIG. 8, with the headliner material being composed of a backing layer or substrate that is laminated to a decorative layer of a covering medium;

FIG. 10 is a fragmentary cross-sectional view similar to FIGS. 8 and 9 and depicts the use of a layer of a resilient deformable material as a covering medium;

FIG. 11 is a view similar to FIGS. 8–10 and depicts the use of a pile-type covering medium, and/or a covering medium that conceals the seam appearing lines to provide a smooth surface confronting the interior of the vehicle;

FIG. 12 is a fragmentary cross-sectional view of another embodiment of the present invention wherein the headliner is fabricated of multiple headliner sections and wherein the under surface thereof is provided with decorative score lines for aesthetic effect and/or to disguise the actual seam and seam appearing lines;

FIG. 13 is a fragmentary cross-sectional view of still another embodiment of the present invention wherein a generally U-shaped retaining element is utilized;

FIG. 14 is a fragmentary cross-sectional view of another alternate embodiment of the present invention wherein adjacent edges of two headliner sections are joined together;

FIG. 15 is a fragmentary cross-sectional view of yet another embodiment of the present invention wherein a resilient covering medium is provided with decorative score lines;

FIG. 21 is an elevated exploded perspective view of a portion of the headliner construction shown in FIG. 16 and depicts one preferred method of connecting adjacently oriented headliner sections thereof;

FIG. 22 is an enlarged fragmentary cross-sectional view of a portion of the connecting assembly shown in FIG. 21;

FIG. 23 is a view similar to FIG. 22 and depicts the connecting assembly in a fully assembled configuration;

FIG. 24 is an elevated perspective view of yet another embodiment of the headliner construction of the present invention;

FIG. 25 is an enlarged fragmentary cross-sectional view taken substantially along the line 25—25 of FIG. 24;

FIG. 26 is an elevated perspective view of still a further embodiment of the headliner construction of the present invention and depicts the folded and connecting portions thereof extending parallel to the longitudinal axis of the associated vehicle;

FIG. 27 is an enlarged fragmentary perspective view of a portion of the headliner construction shown in FIG. 26;

FIG. 28 is an elevated fragmentary perspective view of still a further embodiment of the headliner construction of the present invention;

FIG. 29 is an enlarged fragmentary elevated perspective view of a portion of the headliner construction shown in FIG. 28 with adjacent headliner sections thereof oriented in a pre-assembled configuration;

FIG. 30 is a view similar to FIG. 29 with the adjacent headliner sections being partially assembled;

FIG. 31 is a view similar to FIGS. 29 and 30 and depicts the headliner sections in a final pre-assembled configuration;

FIG. 32 is an elevated fragmentary perspective view of the structure shown in FIG. 31 as it would appear after assembly of the retaining channel on the headliner sections;

FIG. 33 is a fragmentary cross-sectional view taken substantially along the line 33—33 of FIG. 28;

FIG. 34 is an enlarged transverse cross-sectional view of the structure shown in FIG. 32 after the respective components are in a final assembled configuration;

FIG. 35 is a fragmentary cross-sectional view similar to FIG. 34 and depicts still a further embodiment of the present invention; and FIG. 36 is another fragmentary cross-sectional view similar to FIGS. 34 and 35 and illustrates yet another embodiment of the present invention.

DESCRIPTION OF THE PREFERRED EMBODIMENTS

For purposes of clarity of description, the following terms which are used throughout the specification and claims are defined as follows:

Vehicle - Any device for carrying persons or objects, including automobiles, aircraft, watercraft, trucks, busses and the like.

Longitudinal - The direction running the length of the vehicle, i.e., running lengthwise of the vehicle.

Transverse - The direction running across the vehicle at generally right angles to the longitudinal axis of the vehicle.

Seam line - A line or area provided on the underside and at the juncture of two adjacent edges of two joined headliner sections. Seam lines can run either longitudinally or transversely of a vehicle, depending upon the size and shape of the associated headliner sections.

Seam appearing line - Line or lines formed in the side of the headliner confronting the interior of a vehicle simulating or imitating a seam line between two headliner sections.

Headliner plane - The surface of a headliner or headliner section which may be flat or curvilinear depending upon the shape of the headliner.

Roof bow - A structural support member extending either longitudinally or transversely of a vehicle roof and functioning to rigidify and/or strengthen the roof. Typically, automotive vehicle roof bows are not connected to any visual portion of the roof but instead are connected to peripheral roof supporting structure.

Side roof rails - Structural members extending longitudinally along the laterally opposite side edges of a vehicle roof.

Windshield header - A transversely extending structural member located at the forward or windshield end of a vehicle roof.

Backlite header - A transversely extending structural member located at the rear or backlite end of a vehicle roof.

Score line - A line (or multiple parallel lines) formed in the upper and/or lower side or surface of a headliner or headliner section to facilitate bending, folding or otherwise manipulating a headliner, or for simulating a seam line therein. Score lines may be debossed in either surface of the headliner or may be actually cut into the headliner material and/or have portions removed (stripped), depending upon the thickness of the material and/or the ability of the material to compress and bend. In the event the headliner is fabricated of plastic or a similar polymeric material, the score lines could be formed by simply bending the material. Similarly, score lines can be formed in certain types of paperboard-type materials by bending, and with some types of paperboard materials, heat may be used to prepare the paper fibers.

Slit - A cut of a portion of headliner material which may or may not have material removed at the slit, depending upon what type of bending or other formation the headliner material is to be subjected to.

Pile - A surface texture on a covering medium, usually cloth, which may be woven, knitted, tufted, flocked, etc.

Figure 1:
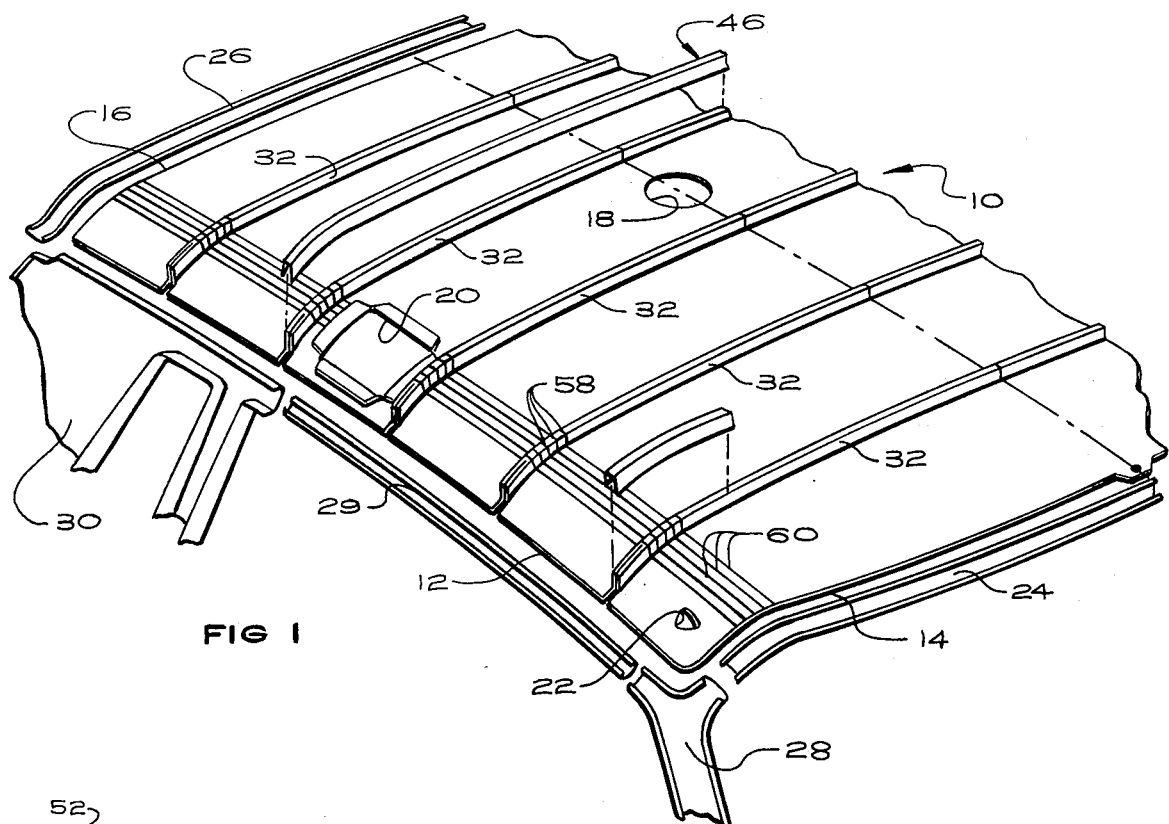
FIG. 1 is an elevated exploded perspective view of one preferred embodiment of the headliner construction of the present invention, as shown in operative association with typical automotive trim or moldings.

Referring now in detail to the drawings and in particular to FIG. 1 thereof, a vehicle headliner construction 10 in accordance with one preferred embodiment of the present invention, is shown, by way of example, as being of generally rectangular shape and including a pair of laterally spaced, longitudinally extending side edges 12, a laterally extending front edge 14 and a laterally extending rear edge 16. The headliner 10, by way of example, is shown as having a central opening or cut-away portion 18 to accommodate an associated vehicle dome light (not shown), and with a similar pair of laterally spaced, longitudinally aligned openings, generally designated 20, which cooperate with the shoulder harness support or retracting mechanisms (not shown) that are typically provided on automotive vehicles. Additionally, the forward or front end of the headliner 10 is shown as being formed with a pair of laterally spaced openings 22 through which the sunvisor mounting brackets or mechanisms (not shown) extend and which function to operatively support the vehicle sunvisors in a manner well known in the art. The headliner 10 is illustrated in a typical operative association with automotive vehicle trim moldings which extend around the periphery of the headliner 10 and function to conceal and/or support the peripheral edges of the headliner 10 at a juxtaposition location relative to the underside of the associated vehicle roof.

Such trim moldings are shown as comprising windshield and backlite trim moldings 24 and 26, respectively, front pillar and side trim moldings 28 and 29, respectively, and rear quarter trim molding 30.

In accordance with the principles of the present invention, the headliner 10 consists of one or more panels which are intended to be die cut, for example, by steel rule die techniques well known in the art, to a preselected shape consistent with the desired configuration of the finally assembled headliner. FIG. 4 depicts the headliner 10 in its original substantially flat die cut shape, and illustrates how the headliner would appear prior to being subjected to the forming operations hereinafter to be described which convert the headliner from the flat shape shown in FIG. 4 to the relatively arcuate or curvilinear configuration shown in FIGS. 1 and 2. The headliner 10 may be fabricated of any suitable relatively high strength and substantially rigid but foldable or formable (either vacuum or otherwise) material, such as composition board, fiberboard, hardboard, foam core board, paperboard, plastic, or alternatively, the headliner 10 may be constructed so as to consist of a plurality of separate layers laminated together in a manner hereinafter to be described. Regardless of the actual construction of the headliner material, it is significant that the material be essentially self-supporting and permit bending or folding of portions thereof without exceeding the yield strength or otherwise buckling or breaking the material.

Figure 3:
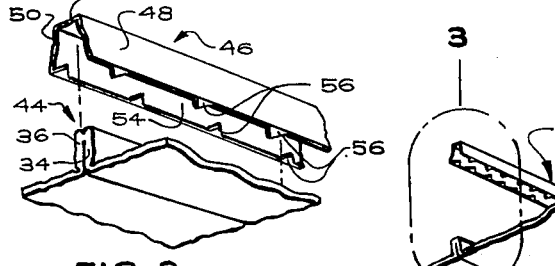
FIG. 3 is an enlarged fragmentary elevated perspective view of the structure shown within the oval 3 of FIG. 2.
Figure 2:
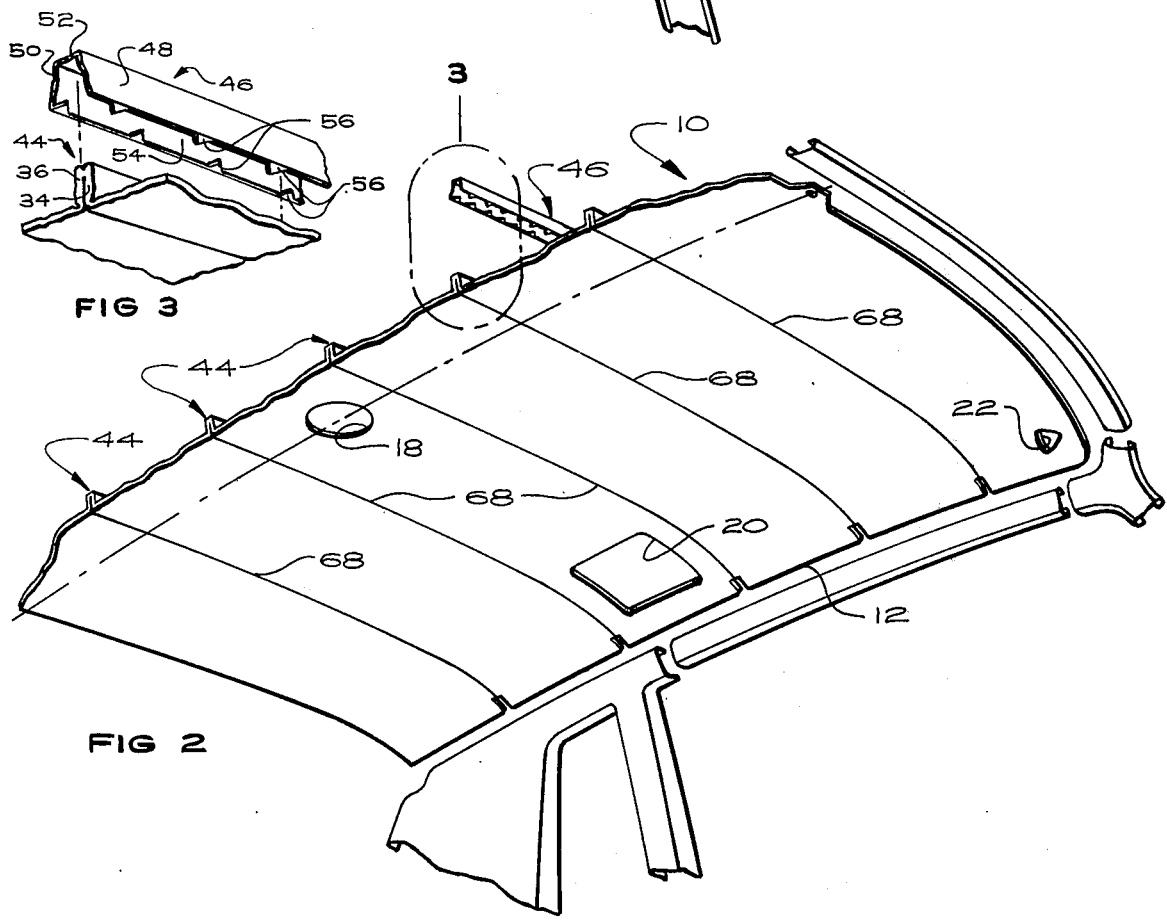
FIG. 2 is a fragmentary perspective view of the underside of the structure shown in FIG. 1.

As best seen in FIGS. 1 and 2, the headliner 10 is formed with a series of longitudinally spaced, laterally extending folded portions, generally designated by numeral 32, the details of which are best seen in FIG. 3. In particular, each of the folded portions 32 consists of a generally inverted U-shaped fold and includes integral side sections 34 and 36 that are connected at their uppermost edges along a score line 42 (see FIGS. 5 and 6) and are connected to the main body of the headliner 10 along score lines 38 and 40, respectively. The score lines 38–42 extend laterally of the headliner 10 at longitudinally spaced parallel locations in the manner best seen in FIG. 4 and the actual scoring of the headliner 10 to provide the lines 38, 40 and 42 may occur on either the upper and/or lower sides of the headliner 10, depending upon the thickness of the material thereof, the actual construction of the material, and the degree of flexibility and compressibility thereof. It will be seen that when the side sections 34, 36 of each of the folded portions 32 are disposed in contiguous side-by-side relation, a plurality of raised transversely extending rigidifying ribs, generally designated 44, are provided along the upper side of the headliner 10, which ribs 44 function to reinforce and rigidify the headliner 10 and render the same essentially self-supporting. It is contemplated that various means may be employed to retain the side sections 34, 36 in their side-by-side relation, such as a suitable adhesive, dielectrically sealing, sewing, stapling, etc. One particularly important feature of the present invention resides in the fact that when the side sections 34, 36 are secured as by sewing or stapling, automobile manufacturers will be able to utilize their existing equipment in their respective automobile trim plants so as to minimize to the extreme the need for purchasing new equipment and the myriad of problems resulting from disposing of existing equipment and eliminating or relocating existing skilled labor. In addition to or instead of sewing, stapling, etc., it is contemplated that the side sections 34, 36 may be secured to one another by means of an elongated inverted U-shaped channel-like member, or other element that will maintain the desired shape, generally designated by the numeral 46. A member 46 may be provided on each of the folded portions 32, or ribs 44, or only on selective ones thereof, depending upon the particular application of the headliner. As best seen in FIG. 3, a typical channel member 46 is shown as comprising downwardly diverging side sections 48, 50 and an interconnecting web or top section 52, the sections 48–52 defining an elongated recess 54 within which the associated rib 44 is adapted to be nestingly received. The channel members 46 are preferably, although not necessarily, fabricated of a suitable metal alloy and are provided with inwardly projecting teeth 56 at the lower ends of the side sections 48, 50. At such time as it is desired to fixedly secure the side sections 34, 36 of a particular rib 44, the sections 34, 36 are initially folded to the position shown in FIG. 3 and the resultant rib 44 is inserted into the recess 54 of the channel member 46 whereupon the side sections 48, 50 may be suitably deformed toward one another by means of an appropriate crimping tool or the like, resulting in the teeth 56 being embedded in the side sections 34, 36 and the side sections 34, 36 being permanently affixed in their operative side-by-side relationship. It may be noted that the channel-like members 46 may extend transversely across the entire width of the headliner 10, or alternatively, one or more of such members 46 may extend only partially thereacross. Additionally, it is contemplated that the members 46 will be suitably curved consistent with the curvature of the ultimate shape of the headliner 10, or suitable means, hereafter to be described, may be employed on the members 46 to permit bending or deformation thereof into this ultimate position.

In accordance with the principles of the present invention, it is desirable to have the headliner 10 assume a relative curved or arcuate shape complementary to the curvature of the associated roof. Toward this end, the plurality of rigidifying ribs 44 are preferably formed with one or more slits or cuts, best seen in FIGS. 1, 5 and 6 and generally designated by the numeral 58. The slits 58 extend longitudinally of the headliner 10, i.e., perpendicular to the ribs 44, and extend partially downwardly from the upper edges thereof toward the score lines 40, 42 as seen in FIG. 6. The actual vertical length of the slits 58 and number thereof will, of course, depend upon the desired curvature to which the headliner is being formed, as well as the material thereof. Also, depending upon the material from which the headliner 10 is fabricated, the thickness thereof and the degree of curvature or bending desired, it may be advantageous to form a plurality of generally parallel score lines 60 on the upper side of the headliner 10, which score lines 60 extend longitudinally along the laterally opposite edges thereof and are preferably, although not necessarily, longitudinally aligned with the aforedescribed slits 58. Such score lines 60 would be optional and it is contemplated that in many types of headliner constructions the score lines 60 would not be necessary.

In order to permit the headliner 10 to be formed without causing any buckling thereof and in order to obtain the desired contour in an aesthetically pleasing manner, it is desirable that the laterally opposite ends of the folded portions 32 be cut away in a V-shaped fashion, as seen at 62 in FIG. 5. The cut-away portions 62 are defined by laterally inwardly converging side edges 64 which intersect at the center line of the associated folded portion 32, i.e., at the score line 42. The length of inward extension of the cut-away portion 62 and the angularity between the sides 64 thereof will, of course, vary with the specific contour and the degree of curvature desired. Toward this end, it is also contemplated that generally rectangular shaped notches, herein designated by the numeral 66, be formed in the longitudinally extending side edges of the headliner 10 at the opposite ends of the folded portions 32. Such rectangular notches 66 will further obviate the possibility of the headliner material buckling or becoming wrinkled upon assembly thereof and will facilitate installation and subsequent assembly of the ancillary vehicle trim moldings hereinabove described.

In accordance with the teachings of the present invention, at such time as the portions 32 of the headliner 10 are appropriately folded so that the side sections 34, 36 thereof are contiguously engaged and secured with one another, each of the portions 32 will provide a transversely or laterally extending seam appearing line 68 (see FIG. 2) on the side of the headliner 10 confronting the interior of the vehicle. The lines 68 will be similar in appearance to the seams provided when adjacent sections of conventional cut-and-sewn headliners are installed in a vehicle, but are achieved without the complicated listing wire arrangements and time consuming custom tailoring and fitting necessary with cut-and-sewn headliners. Moreover, the folded portions 32, by providing the above-described rigidifying ribs 44, enable the headliner 10 to be essentially self-supporting so that listing wire-type devices associated with cut-and-sewn headliners will not, in a great many applications, be required. After the headliner 10 has the various folded portions 32 properly formed, either with or without the use of the aforementioned channel members 46, the headliner may be placed or positioned within the associated vehicle adjacent the underside of the roof thereof, and the various trim moldings 24–30 may be assembled to fixedly secure the headliner in its proper operative position and conceal the edges thereof in a manner well known in the art. It is to be noted that when the headliner is formed by vacuum forming techniques, it may be possible to eliminate the need for scoring along the ribs 44 and/or forming the slits 58 and/or cut-away portions 62.

Reference is made to FIG. 13 wherein an alternate embodiment of the present invention is shown as comprising a headliner construction 78 that is formed with a folded portion 80 which extends across the headliner and functions in the above-described manner in providing a rigidifying or strengthening rib. More particularly, the folded portion 80 is of a generally triangular shape in cross section and includes a pair of upwardly diverging side sections 82 and 84 and an upper or top section 86 extending between and integrally connected to the side sections 82, 84. The folded portion 80 is shown in operative association with a generally inverted U-shaped channel member, generally designated 88, which is generally complementary in shape to the folded portion 80 and includes downwardly converging side portions 90 and an integral top portion 92. As will be appreciated by those skilled in the art, the channel-like member 88 is adapted to slide transversely onto the folded portion 80 and thereby retain the lowermost portions of the side sections 82, 84 in contiguous relationship with one another. It will be noted that for certain applications, multiple members 88 may be employed for each folded portion 80; for example, two somewhat shorter length members 88 could be slid one onto each end of the portions 80. In order to provide for the desired folding of the material constituting the headliner construction 78, it may be desirable to provide a pair of score lines 94, 96 on the side of the headliner 78 confronting the interior of the vehicle and/or a second pair of parallel score lines 98 and 100 on the opposite (upper) side of the headliner 78. The necessity of such score lines is, of course, dependent upon the thickness of the headliner material and degree of compressibility thereof, as will be appreciated by those skilled in the art. Upon assembly of the channel-like member 88 onto the folded portion 80, a seam appearing line 102 will be provided along the underside of the headliner 78 which will provide the desired aesthetic effect described above.

As previously mentioned, the material from which the headliner embodiments of the present invention are fabricated may consist of a wide variety of alternative constructions. One preferable and relatively simple and economical construction is shown in FIG. 8 wherein a headliner material 104 is shown as having a finished surface 106 provided directly on the lower side thereof, which surface 106 may be colored, textured or have any other suitable design imprinted or otherwise embellished thereon so as to provide the desired appearance. It is contemplated that for certain applications, the material 104 may be provided with a moisture barrier fabricated, for example, of polyethylene or other suitable moisture resistant substance, on the rearward or upper side thereof, as generally indicated by the numeral 108.

FIG. 9 illustrates another alternate embodiment of the present invention wherein a headliner construction 110 is shown as comprising a laminated composite structure including a substrate layer 112 and a covering medium 114. The construction shown in FIG. 9 is similar to the lower portion of the headliner construction shown in FIG. 4 wherein the covering medium is shown partially peeled away. As will be appreciated, the composite or laminated headliner construction 110 has a number of important advantages over a single layer headliner construction, probably the most important of which resides in the variations in appearance which may be achieved through the use of covering mediums of different styling, color, texture, etc. It is contemplated that the covering medium 114 can be applied to the substrate 112 prior to the headliner construction 110 being die cut and having the various folded portions formed therein, although for certain applications, it may be desirable to apply the covering medium after the folded portions have been formed in the substrate layer 112, as seen in FIG. 11. FIG. 10 illustrates a similar embodiment to that shown in FIG. 9 wherein a headliner construction 116 is shown as comprising a substrate layer 118 having a covering medium 120 on the underside thereof. The covering medium 120, by way of example, may consist of a resilient deformable foam-like material to provide for higher quality appearance and sense of touch, and possibly, to provide for improved heat and sound insulation, as compared to the covering medium 114 of the headliner 110 which typically might consist of vinyl or similar plastic coated paper-like material. FIG. 11 depicts a similar headliner construction, generally designated 122, wherein a substrate material 124 is shown as having a pile-type covering medium 126 applied thereto. Such a covering medium 126 could typically consist of woven or non-woven fabric having cut, loop or flocked pile on the surface thereof to provide the desired aesthetic appearance for the interior of the vehicle. It will be noted that in the headliner construction 122 of FIG. 11, the covering medium 126 is applied to the substrate 124 after a folded portion is formed in the substrate 124 and as such, the covering medium 126 disguises or conceals the fold or seam appearing line provided by the folded portion, as may be desirable for certain types of applications. It will also be noted that when multiple layer headliner constructions are utilized, it is not necessary that all of the layers be installed simultaneously. For example, the substrate material 124 could initially be installed in a vehicle, and thereafter a covering medium 126, fabricated of a lightweight vacuum formed plastic material or the like, could be installed beneath the substrate to cover the seams, joints, etc., therein.

The scope of the present invention is intended to include headliner constructions consisting of more than one headliner section or panel, as well as those wherein the headliner is provided by a single unitized member. A fragmentary cross section of such a headliner construction, herein designated 128, is shown in FIG. 12 wherein headliner sections 130 and 132 are shown in operative association with one another. The sections 130, 132 are formed with folded upwardly extending adjacent edge portions 134 and 136, respectively, that are arranged at generally right angles or perpendicular to the plane of the headliner 128 defining a seam line 138 therebetween. The folded edge portions 134, 136 may be connected in any suitable manner, such as by sewing, heat sealing, stapling, etc., as previously described in connection with the means for connecting the side sections of a reversely folded portion, such as the folded portions 32 embodied in the headliner 10. One or both of the headliner sections 130, 132 may be provided with one or more folded portions, such as the folded portion 140 on the headliner section 130. The folded portion 140 comprises reversely folded upwardly extending side sections 142 and 144 which are secured together by any suitable means and define a seam appearing line 146. The side of the headliner 128 facing the interior of the associated vehicle may be formed with additional lines in the form of score lines, generally designted 148, running parallel or at an angle to the aforementioned seam line 138 and/or seam appearing line 146, whereby to create any desired appearance. It will be noted that together with serving to operatively connect the headliner sections 130, 132, the folded edge portions 134, 136 thereof provide a reinforcing rib or ridge similar to the rib provided by the folded portion 140, whereby to strengthen and reinforce the headliner 128.

FIG. 15 illustrates a headliner construction 150 that is similar to that shown in FIG. 12 and which comprises two adjacently oriented headliner sections 152 and 154 that are fabricated of a substrate layer 156 and a covering medium or layer 158. The headliner sections 152, 154 are provided with upwardly extending folded edge portions 160 which are suitably secured to one another and define a seam line 162. If desired, the headliner 150 may be provided with reversely folded portions, such as that designated by the numeral 164 and consisting of side sections 166 and 168 and defining a seam appearing line 170. The headliner construction 150 differs from the headliner 128 in that it is provided with the covering medium 156 which is formed with additional score or artificial seam lines 172, thereby indicating the universality of design available with the teachings of the present invention.

FIG. 7 illustrates a variation in construction of the headliner 10 shown in FIGS. 5 and 6, wherein a headliner construction 174 is depicted as comprising a reversely folded portion 176 having adjacently oriented upwardly extending side portions 180 and 182, respectively, the folded portion 176 being properly slit or cut as seen at 184 to permit bending of the longitudinally extending edges of the headliner 174. Additionally, if desired, suitable score lines 186 may be formed in the headliner 174 to facilitate such bending. The side portions 180, 182 are adapted to be operatively connected to one another by means of an inverted U-shaped channel-like member 188, similar in construction to the channel member 46 hereinabove described, and adapted to nestingly receive the upwardly extending folded portion 176. The headliner 174 is shown as comprising a substrate layer 190, an intermediate layer 192, and a covering medium 194 which may be of any suitable construction consistent with the desired appearance. One or more of the layers of laminations 190, 192 or 194 may be formed with suitable perforations, generally designated 196, for purposes of sound deadening, heat absorption, etc., and to enhance the appearance of the headliner construction 174, with all three of said layers 190, 192 and 194 being perforated, by way of example in the construction shown in FIG. 7. As an additional alternative, a substrate layer could be formed with a plurality of perforations or "lightening holes" that are concealed by an associated covering medium, whereby to provide for a relatively lightweight headliner construction.

FIG. 14 illustrates still another manner of connecting two adjacently oriented headliner sections wherein a headliner construction 200 is shown as comprising headliner sections 202 and 204, the former of which is formed with an upwardly and transversely extending edge portion 206 that is nestingly received within a transverse recess or slot 208 formed at the edge of the headliner section 204. More particularly, the recess or slot 208 is formed by a generally reversely folded, inverted U-shaped edge portion of the headliner section 204 and consisting of an upwardly extending portion 210, a downwardly extending portion 212 and an intermediate or connecting portion 214. The edge portions 206, 210 and 212 may or may not be coextensive of one another and may be connected by any suitable means, whereby to define a seam line 216 that is cooperative with additional seam lines, seam appearing lines and/or score lines (not shown), depending upon the desired appearance of the headliner construction 200.

Referring now to FIGS. 16 and 21–23, a headliner construction 220, in accordance with another preferred embodiment of the present invention, is shown as being fabricated of multiple headliner sections, including a forward section 222, a pair of adjacently oriented intermediate sections 224, 226, and a rearward section 228. The intermediate sections 224, 226 are formed with a plurality of transversely extending reversely folded portions 230 that provide transverse reinforcing ribs 232, as described in connection with the aforementioned headliner construction 10. The ribs 232 are formed with longitudinal slits 234 adjacent the laterally outer edges of the headliner 220, the slits 234 being longitudinally aligned with longitudinal score lines 236, with the score lines 236 and slits 234 permitting selective bending or curving of the edges of the headliner sections 224, 226 in order to accommodate for the curvature of the associated vehicle roof.

The transversely extending confronting edges of the headliner sections 224, 226 are formed with upwardly extending folded edge portions 238 and 240, respectively, which are formed with suitable slits aligned with the score lines 236 for the purpose of permitting bending, and which are adapted to be abuttingly engaged with one another and be fixedly secured by means of a connecting assembly, generally designated by the numeral 242. The assembly 242 extends transversely of the entire headliner 220 and comprises first and second connecting parts 244 and 246 which are coextensive of the folded edge portions 238, 240 and are preferably fabricated of a molded plastic material. The connecting parts 244, 246 are in the form of elongated flat strips which have the opposite ends thereof turned downwardly as seen in FIG. 21 so as to conform with the arcuate edges of the headliner sections 224, 226. The connecting part 246 is formed with a plurality of longitudinally extending projections which are laterally spaced along the part 246 and are adapted to be aligned with and extend through complementary arranged apertures 250 formed in the folded edge portions 238, 240. The connecting part 244 is formed with a series of laterally spaced apertures, generally designated 252, which are adapted to be aligned with the apertures 250 and projections 248, whereby the projections 248 will extend through the apertures 250, 252 upon assembly of the connecting parts 244, 246. Each of the projections 248 is formed with an enlarged diameter frustoconical head portion 254 having a transverse slot 256 extending diametrically therethrough and a tapered outer surface 258. The maximum diameter of each head portion 254 is slightly larger in diameter than the size of the apertures 250, 252, with the associated slot 256 permitting contraction or inward deformation of the head portion 254 upon insertion thereof through the apertures 250, 252. At such time as it is desired to fixedly secure the intermediate sections 224, 226 to one another, the folded edge portions 238, 240 thereof are abuttingly engaged and the connecting parts 244, 246 are oriented on the longitudinally opposite sides thereof, with the projections 248 and apertures 252 being aligned with the apertures 250. Thereafter, the projections 248 are inserted through the apertures 250 in the edge portions 238, 240 and thereafter through the apertures 252 in the connecting part 244. As previously mentioned, by virtue of the provision of the slots 256, as well as the resilient character of the material from which the connecting assembly 242 is fabricated, the enlarged head portions 254 will deform slightly as they are inserted through the apertures 250, 252, after which time the head portions 254 will expand to the position shown in FIG. 23, thus positively securing the headliner sections 224, 226 together. It will be appreciated, of course, that various alternative types of connecting means can be utilized and that the connecting assembly 242 hereinabove described is only one of many satisfactory arrangements whereby two adjacent headliner sections may be connected so as to provide a pleasant appearing seam line along the underside of the juncture thereof, which seam line will be simulated by the seam appearing lines provided by the associated reversely folded portions 230 on the headliner sections 224, 226 to provide a desired aesthetic appearance on the side of the headliner confronting the interior of the vehicle. For example, it is contemplated that a one-piece connecting assembly could be used wherein deformable "finger" portions extend through the apertures 250 and are suitably deformed to effect securing of the edge portions 238, 240.

Figure 16:
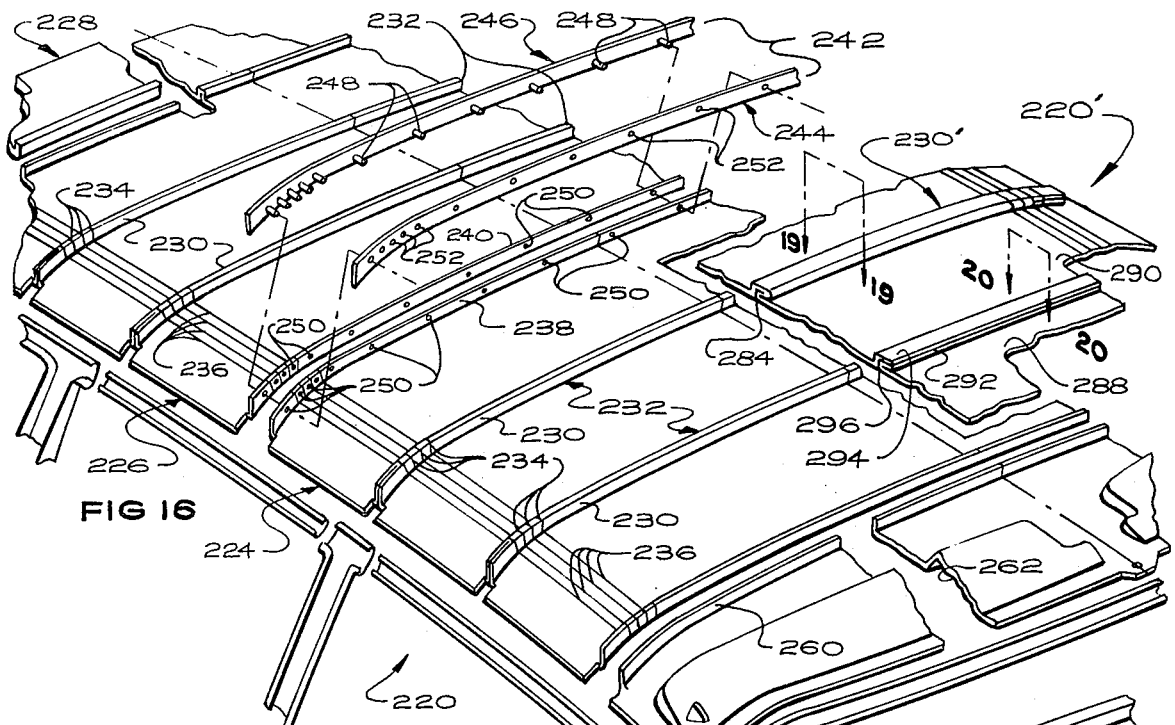
FIG. 16 is an elevated fragmentary perspective view of yet another embodiment of the headliner construction of the present invention.

The forward and rearward sections 222 and 228 of the headliner 220 are shown as being fabricated of a material other than the material from which the headliner sections 224, 226 are constructed, i.e., other than fiberboard, paperboard, etc., or similar type construction described in connection with the headliner construction 10. More particularly, the headliner sections 222, 228 are adapted to be fabricated of some material which lends itself to molding techniques so that the sections 222, 228 may be formed to a shape other than that to which a fiberboard or similar type construction can be conveniently formed. By way of example, the forward headliner section 222 is fabricated of a molded resilient deformable material, such as polyurethane or the like which has an under surface identical or complementary in appearance to the under surface of the headliner sections 224, 226, but which has impact absorbing capability for purposes of protecting the vehicle occupants in theh event of an automobile accident or the like. The forward headliner section 222 is provided with a molded rearwardly disposed upwardly and transversely extending edge portion 260 which may be secured to the adjacent edge portion of the headliner section 224 by any suitable means, such as the connecting assembly 242, or by sewing, stapling, etc. By way of example, the headliner section 222 is formed with a recessed area 262 extending transversely of the vehicle and adapted to nestingly receive the associated vehicle sunvisor (not shown), whereby the visor may be recessed in an out-of-the-way position when not in use. The recessed area 262 may extend entirely across the width of the vehicle or instead, be provided in two transversely spaced locations, such as is shown in FIG. 16. Additional recessed areas could also be incorporated in the headliner section 222 for mounting and accommodating miscellaneous lights, controls and instrumentation.

The rearward headliner section 228 may be fabricated of a material similar to the section 222, or instead be fabricated of any other suitable material which facilitates molding and/or other forming to a shape consistent with the rearward end of the roof of the associated vehicle. It is contemplated that the headliner construction 220 be utilized in a station wagon, van, or similar type vehicle and as such, the rearward headliner section 228 could be fabricated of a material adapted to house or enclose a portion of the associated rear tailgate or backlite retraction assembly, as will be appreciated by those skilled in the art. The headliner section 228 can be secured to the adjacent edge of the section 226 in any suitable manner, with the joint therebetween, as well as the joint between headliner sections 222 and 224, providing seam lines consistent in appearance to the rest of the seam lines and/or seam appearing lines embodied in the headliner 220.

Figure 18:
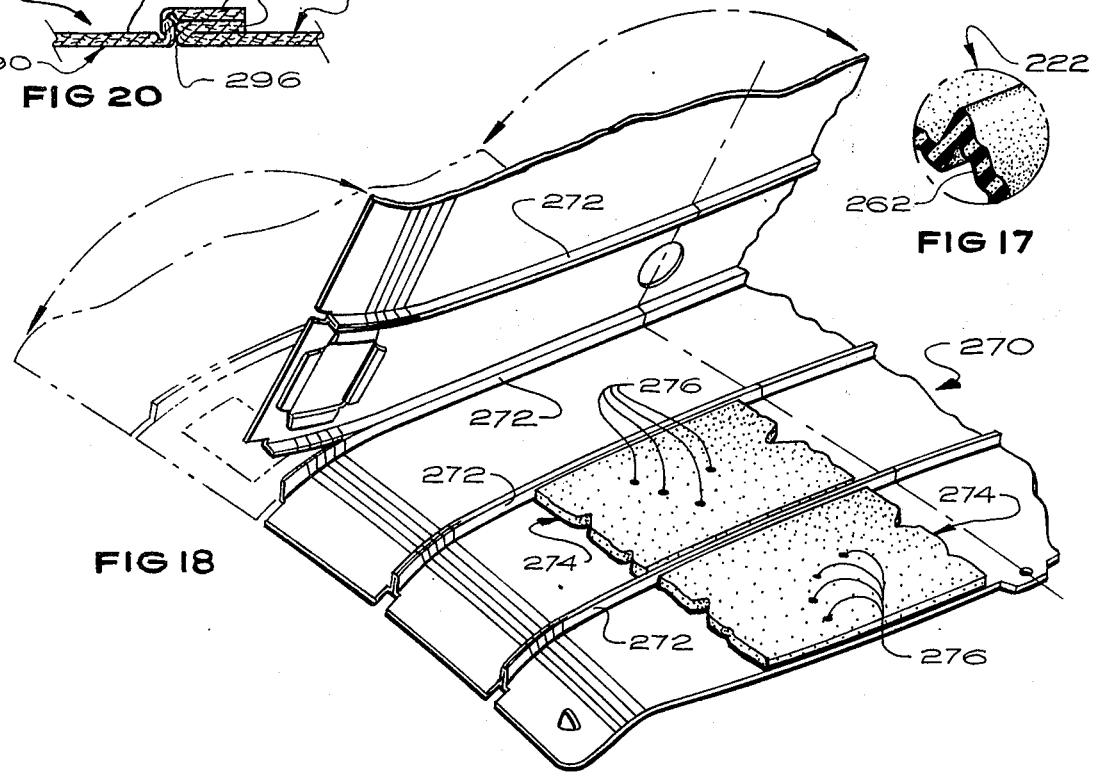
FIG. 18 is an elevated fragmentary perspective view of yet a further embodiment of the headliner construction of the present invention and illustrates the headliner as it would appear when partially folded to facilitate insertion into an automotive vehicle.

FIG. 18 illustrates a headliner 270 which is constructed in accordance with the principles of the present invention and is fabricated with a plurality of longitudinally spaced transversely extending reversely folded portions 272 which provide rigidifying ribs, as above described, and between which may be located sections of a pad or foam-like sound and/or heat insulating material, such as sections 274 fabricated of polyurethane or Styrofoam, that many function in a heat and sound absorbing capacity and/or function to further rigidify the headliner 270 or otherwise enhance the structural integrity thereof. It is contemplated that the pad or foam sections 274 be laminated or otherwise secured to the upper side of the headliner 270 and it is also considered possible that particles or elements, generally designated by the numeral 276, of a magnetic material be embedded in the pad or foam sections 274, which magnetic elements will be magnetically attracted to the metal roof of the associated vehicle and hence function to at least partially support the headliner 270 therewithin. Depending upon the size and number of elements 276, such elements may function to entirely support the headliner 270 within an associated vehicle or instead may be merely used to minimize vibration or other movement of the central portion thereof relative to the associated roof.

The headliner construction 270 also illustrates a further feature of the present invention whereby a headliner may be folded to a predetermined degree to facilitate insertion thereof through an opening in a vehicle which is smaller in size than the ultimate (unfolded) size of the headliner. Such folding can easily be accomplished through the provision of the folded portions 272 which permit the folding of the headliner about a transversely extending axis, with the folding operation being completely disguised in that the fold line will appear simply as one of a plurality of seam appearing lines on the underside of the assembled headliner. This feature is believed to be particularly advantageous for certain types of automotive vehicles which undergo a water leakage test after the windshield and backlite have been installed and before any interior trim is assembled, which necessitates that the headliner be inserted into the car through a door opening that is typically smaller than the ultimate size of the headliner. Additionally, of course, the folding feature may also be advantageous in the packaging and/or storage of the headliner, as will be appreciated by those skilled in the art.

Figure 19:
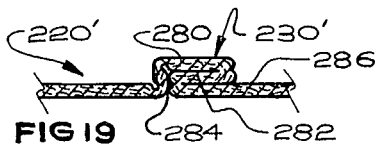
FIG. 19 is an enlarged fragmentary cross-sectional view taken substantially along the line 19—19 of FIG. 16.
Figure 17:
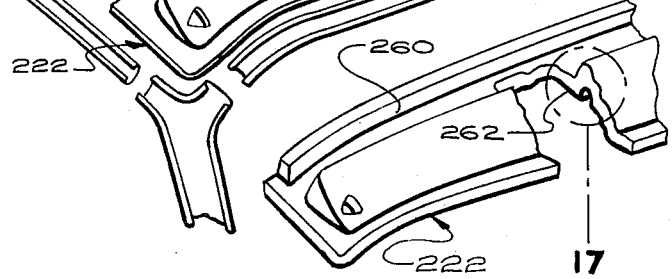
FIG. 17 is an enlarged fragmentary view of the portion of the headliner construction shown within the circle 17 of FIG. 16.
Figure 20:
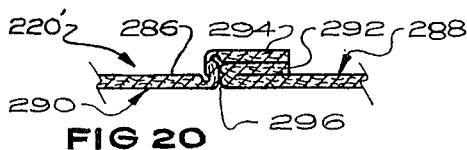
FIG. 20 is an enlarged fragmentary cross-sectional view taken substantially along the line 20—20 of FIG. 16.

FIGS. 19 and 20 illustrate a slightly modified construction of the headliner 220 shown in FIG. 16. More particularly, FIGS. 19 and 20 illustrate a headliner construction 220' which is shown as being partially broken away from the headliner 220 in FIG. 16 consisting of at least one folded portion 230' analogous to the reversely folded portions 230 hereinabove described and including parallel side sections 280 and 282 which define a seam appearing line 284 along the underside of the headliner construction 220'. The folded portion 230' differs from the portions 230 in that instead of the side sections 280, 282 being arranged perpendicular to the plane of the headliner, the sections 280, 282 are arranged generally parallel to the headliner plane, with the lowermost of the side sections 282 being contiguously engaged and, if desired, fixedly secured to the upper surface 286 of the headliner 220', as seen in FIG. 19. FIG. 20 illustrates the headliner construction 220' when the same is comprised of at least two headliner sections 288, 290 having edge portions 292 and 294, respectively, that are fixedly secured to one another by any suitable means and define a seam line 296. The edge portions 292, 294, instead of being arranged perpendicular to the plane of the headliner as is the case with the edge portions 238, 240 of the headliner sections 224, 226, are arranged generally parallel to the headliner, with the edge portion 294 being secured, if desired, directly to the upper surface 286. The folded portion 230' and edge portions 292, 294 will find particularly useful application in roof constructions where interior height requirements are particularly severe so that space between the headliner and underside of the roof must be minimized to the extreme. The construction shown in FIGS. 19 and 20 will be seen to exhibit all of the previously described advantages of the present invention and yet facilitate mounting the headliner at a position closer to the associated roof and/or roof bows and thus achieve greater head room clearance.

As previously mentioned, it is contemplated that for certain types of headliner installations, some type of ancillary support means may be desired, notwithstanding the fact that the principles of the present invention are adapted to find particularly useful, although not exclusive, application in self-supported type headliner applications. Accordingly, various hereinafter described embodiments of the present invention are shown in operative association with different types of headliner support means which may be conveniently incorporated in a headliner design in accordance with the present invention. FIGS. 24 and 25 depict a headliner construction 300 which includes one or more transversely extending reversely folded portions 302, each of which includes side sections 304 defining an enlarged loop 306 providing a transversely extending passageway 308 therethrough. The side sections 304 may be secured to one another by any suitable means directly adjacent the upper side of the headliner, whereby a seam appearing line 310 is provided below and coextensive of each of the folded portions 302. By way of example, support means in the form of an elongated rod-shaped support element 312 is associated with each or selected of the folded portions 302. While it is possible that the rod elements 312 may consist of a single member, due to the arcuate shape of the longitudinally extending side edges of a typical headliner, it may be preferably to provide each of the rod elements in the form of two rod sections 314 and 316, the ends of which that are disposed adjacent the side edges of the headliner 300 being suitably curved or formed consistent with the curvature of the associated roof. In a typical installation, the center of each of the folded portions 302 provided with a rod element would be cut away, as seen at 318, to accommodate a rod section coupling or sleeve 320 having a suitable bore or bores formed in the opposite ends thereof and into which the inner ends 321 of the rod sections 314, 316 could be inserted after the rod sections 314, 316 have been inserted from the opposite ends of the passage 308, as illustrated in FIG. 24. It is contemplated that the laterally opposite ends of the rod sections 314, 316 herein designated by the numeral 322, would project laterally beyond the longitudinal side edges of the headliner 300 so that they may be operatively secured to associated structural roof rails (not shown) running longitudinally of the side edges of the associated roof in much the same manner as listing wires have been utilized in the past in connection with cut-and-sewn headliners, whereby to assist in supporting the headliner 300 once it has been installed within the vehicle. For certain types of applications, the ends of loops 306 may stop short of the side edges of the headliner 300. With this arrangement, the side edges of the headliner would not necessarily conform to the arcuate shape of the rod elements 312 and would be relatively flexible to facilitate installation of the headliner 300 within the associated vehicle.

While reference has been made hereinabove to the various headliner designs being provided with transversely or laterally extending reversely folded portions and/or edge portions to provide laterally extending seams and seam appearing lines on the underside of the headliners, the present invention is not intended to be limited to this specific construction, since it is conceivable that for certain types of applications, the seam lines and seam appearing lines may run longitudinally (as opposed to laterally) of the associated vehicle. Such an arrangement is shown in FIGS. 26 and 27 wherein a headliner construction 330 is shown as comprising adjacenly oriented headliner section 332 that are arranged in lateral side-by-side relationship and extend longitudinally of the associated vehicle. The headliner sections 332 are provided with longitudinally extending reversely folded portions 334 consisting of adjacently oriented upwardly projecting parallel side portions 336 that are spaced laterally from one another and are formed with transversely disposed slits 338 that may be arranged in alignment with transversely extending score lines 340 to facilitate bending or arcuate conformation of the forward and/or rearward ends of the headliner 330 to accommodate for the associated roof curvature. The adjacent portions of the headliner sections 332 are formed with upstanding longitudinally extending side edge portions 342 and 344 that may be secured together by any suitable manner, such as by an inverted U-shaped longitudinally extending channel member 346 (similar to the aforedescribed channel member 46). Similar type channel members 346 may be used for fixedly securing the side portions 336 of the folded portions 334, as shown in FIG. 27, with the result that a plurality of laterally spaced longitudinally extending seam appearing lines of the same general appearance as the seam line between the side portions 342, 344, will be provided on the underside of the headliner 330. In the event it is desired to provide some type of support means for the headliner 330, it is contemplated that such support means may be provided by one or more laterally extending wires or rods 348 extending through aligned apertures 350 in the folded portions 334 and edge portions 342, 344, with the laterally opposite ends of the wire or rods being suitably supported in or adjacent the roof rails of the associated roof structure, as shown in FIG. 26.

FIGS. 28–34 illustrate still a further embodiment of the present invention which may, if desired, have ancillary headliner support means to assist in operatively supporting the headliner within a vehicle. More particularly, a headliner construction 360 is shown as comprising headliner sections 362, 364 and 366 that are formed with laterally extending reversely folded portions 368 similar to those shown in FIG. 1. Suitable slits 370 are formed in the folded portions 368 and are aligned with score lines 372 to facilitate arcuate formation of the longitudinal side edges of the headliner 360, as above described. If desired, V-shaped portions 374 may be cut away in the laterally opposite ends of the folded portions 368 and notches 376 may be formed adjacent thereto in order that the desired curvature of the headliner 360 may be achieved when the folded portions 368 are formed therein. In accordance with the principles of this embodiment of the present invention, the confronting edges of the headliner sections 362, 364 and 366 are comprised of edge portions 378 which are adapted to be fixedly secured to one another by means of transversely extending combination connecting and support elements, generally designated by the numeral 380. More particularly, each of the edge portions 378, as best seen in FIG. 29, is formed with a pair of parallel transversely extending score lines 382, 384 which enable the edge portions 378 to be folded into a generally perpendicular edge portion 386 in a first stage of assembly, as seen in FIG. 30, and in a second stage of assembly, with a portion 388 that extends generally parallel to the plane of the headliner 360, as seen in FIG. 31. At such time as two adjacent edge portions 378 are juxtapositioned one another, the edge portions 386 thereof will be abuttingly engaged and extend perpendicular to the plane of the headliner 360, whereas the edge portions 388 will extend in opposite directions in a generally coplanar fashion parallel to the plane of the headliner 360. When the two edge portions 378 are thus arranged, a generally T-cross sectioned rib is provided thereby and defines a seam line 390 on the underside of the headliner 360, as best seen in FIG. 31.

Each of the combination connecting and support elements 380, as best seen in FIGS. 31 and 34, comprises spaced parallal downwardly extending side sections 392 and 394 that are integrally connected at their uppermost parts by a top section 396. The lowermost parts of side sections 392, 394 are formed with integral inwardly extending flange sections 398, 400, respectively, which define with the sections 392–396, a generally T-cross sectioned recess or slot 402 which is complementary in size and shape to the T-shaped rib provided by adjacently positioned edge portions 378 of each pair of confronting headliner sections 362, 364 and 364, 366. Each of the elements 380 is also formed with an upwardly extending transversely disposed projection portion 404 formed integrally of the top section 396 thereof and including an enlarged thickness head portion 406. As best seen in FIG. 34, the head portion 406 includes a pair of downwardly diverging shoulders 408 and 410 which are preferably sufficiently deformable or flexible to permit insertion thereof through an elongated slot 412 formed in the underside of an associated roof bow or channel 414. More particularly, the elements 380 are preferably fabricated of a molded or extruded polymeric plastic material that is sufficiently flexible in nature to permit inward deflections of the lowermost edges of the shoulders 408, 410 such that when the projections 404 are biased upwardly through the slots 412, the shoulders 408, 410 will initiallly deflect inwardly and then be biased outwardly under the inherent resilience thereof after the entire head portion has passed through the slot 412. In typical automotive vehicles, roof bows or channels 414, one of which is shown in FIG. 28, extend transversely below the associated vehicle roof and function in a strengthening or rigidifying capacity for the roof structure. Typically the roof bows are not secured in any manner directly to the vehicle roof per se, but instead, are connected along the outer longitudinal edges thereof, for example, to the longitudinally extending roof rails or the like. Although on some vehicles, only a single roof bow is employed, in the embodiment shown in FIG. 28, it is contemplated that a roof bow would extend laterally and be in longitudinal alignment with each of the joints or seams between the adjacent headliner sections 362–366, even though only a single roof bow 414 is shown in the drawings. As seen in FIG. 34, the roof bow 414 includes a central portion 416 which is arranged generally parallel to the associated vehicle roof, herein designated by the indicia R, and is provided with a pair of integral coextensive leg parts 418 which extend upwardly toward the underside of the roof R. It may be noted that on certain types of vehicles, a double roof is employed instead of separate roof bows. Accordingly, the term "roof bow" as used herein is intended to include the inner roof panel or member on such double roof constructed vehicles. By way of example, the laterally opposite ends of the roof bows are provided with end flanges 420 adapted for attachment as by welding or the like to the associated roof rails, one of which is shown in FIG. 33 and designated by the numeral 422. Suitable trim molding or the like is typically applied to the roof rails for concealing the edges of the headliner 360, as will be described, a typical trim molding being shown in the FIG. 33 and identified by the numeral 423. It will be noted that the projections 404 may be coextensive of the associated elements 380 or instead, each element may be provided with one or more projection sections spaced laterally thereacross, it being appreciated that the slots 412 in the roof bows are to be provided in a similar size (length) and number to facilitate assembly of the elements 380 thereto. Additionally, it is to be noted that the laterally opposite ends of the elements 380 may be provided with suitable slits or cuts 424, as seen in FIGS. 31 and 32, to enable bending of the ends of the elements 380 to conform with the roof curvature. Furthermore, slits 425 are preferably provided in the edge portions 378 to facilitate such bending, as best seen in FIGS. 28 and 30.

In order to effect assembly of the headliner sections 362, 364 and 364, 366, the edge portions 378 thereof are abuttingly arranged and the respective connecting elements 380 are aligned so that the edge portions 388 may be inserted into the T-shaped recesses 402 in the elements 380. Typically, the elements 380 would be moved transversely of the headliner sections 362, 364 and 366 so that the edge portion 388 would be telescopically received into the recesses 402. When the elements 380 have thus been assembled onto the headliner sections 362–366, said sections will be operatively connected to one another and the entire assemblage is then adapted to be installed in the associated vehicle. Once the assembled headliner 360 has been properly placed in the vehicle and positioned relative to the roof bows 414 thereof, the headliner 360 is moved upwardly, whereby the projections 404 will be biased through the slots 412 in the roof bows 414. Once the shoulder portions 408 have passed entirely through the slots 412, the underside of the shoulders 408 will bear upon and be supported by the roof bows 414, with the result that the entire headliner assembly will be effectively supported beneath the associated vehicle roof. It will be noted that with the above-described construction, the headliner 360 would be assembled prior to being installed into the associated vehicle, although the longitudinally extending side edges thereof would not assume the curved or arcuate shape shown in FIGS. 28 and 32 until the headliner is actually moved into its operative position adjacent the underside of the vehicle roof. Thereafter, suitable trim molding, such as is indicated at 423 in FIG. 33 may be applied to conceal the edges of the headliner 360.

FIGS. 35 and 36 illustrate slightly modified embodiments of the above-described element 380, with FIG. 35 depicting a connecting element 426 having downwardly depending converging side sections 428 and 430 defining a generally triangular cross section recess 432 adapted to nestingly receive a complementary triangular-shaped reversely folded portion 434, such as the folded portion 80 shown in FIG. 13, and consisting of side sections 436, 438, a top section 440 and defining a seam appearing line 442. FIG. 36, on the other hand, depicts a connecting element 444 having spaced parallel downwardly depending side sections 446 and 448 defining a rectangular cross section recess 450 adapted to nestingly receive a reversely folded portion 452, similar to one of the folded portions 32 of the headliner 10 and consisting of side portions 454, 456 and defining a seam line 458. It will be appreciated, of course, that the connecting elements 380 may be varied in design to accommodate many different types of folded and/or joined headliner sections, for example, an assembly 242 such as is shown in FIGS. 21–23 could be used for this purpose, without departing from the scope of the present invention.

It will be seen from the foregoing that the present invention provides a new and improved headliner concept that overcomes a number of the serious objections which have heretofore existed with regard to cut-and-sewn headliners, namely, the time and labor consuming cutting, tailoring and fitting thereof. Additionally, the headliner design of the present invention takes advantage of the many features of molded headliners, yet eliminates the disadvantages. The various headliner constructions hereinabove described can all be manufactured with extremely low cost tooling and will minimize installation time to the extreme. By virtue of the many covering mediums that may be incorporated therewith, universality of application may be readily achieved. Wide and diversified use will also result from the fact that the headliner designs may be either self-supporting or may be provided with ancillary support means so that the actual headliner could be fabricated of lighter weight materials, depending upon the size and configuration of the associated vehicle roof. More importantly, however, the present invention provides a headliner construction that may be made to be extremely pleasing in appearance without the objectionably high costs of prior art type headliners, with the headliner designs of the present invention being extremely simple to install and having long and effective operational lives.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A vehicle headliner construction adapted to be mounted adjacent the underside of a vehicle roof and extend laterally between the longitudinal side edges of the roof and longitudinally between the front and rear edges of the roof,
    said headliner comprising a sheet of a relatively rigid but foldable material having at least one reversely folded portion providing a seam appearing line on the side of the headliner confronting the interior of the vehicle.

2. The invention as set forth in claim 1 wherein said line extends between the side edges of said headliner.

3. The invention as set forth in claim 1 wherein said line extends laterally of said headliner between the longitudinally side edges of said headliner.

4. The invention as set forth in claim 1 wherein said line extends longitudinally of said headliner between the forward and rearward edges thereof.

5. The invention as set forth in claim 1 which includes a plurality of folded portions each of which provides a seam appearing line.

6. The invention as set forth in claim 5 wherein said plurality of folded portions are generally parallel to one another.

7. The invention as set forth in claim 1 wherein said headliner comprises at least two sections having adjacent edges joined together to form an actual seam line, and wherein said seam appearing line and said actual seam line are similar in appearance.

8. The invention as set forth in claim 7 wherein said seam appearing line on said headliner is arranged generally parallel to said actual seam line.

9. The invention as set forth in claim 1 wherein said folded portion comprises a pair of adjacently oriented substantially parallel side sections.

10. The invention as set forth in claim 9 wherein said side sections are arranged generally perpendicular to the plane of said headliner.

11. The invention as set forth in claim 9 wherein said side sections are arranged generally parallel to the plane of said headliner.

12. The invention as set forth in claim 9 wherein a portion of each of said side sections is arranged perpendicular to the plane of said headliner and another portion of each of said side sections is arranged parallel to the plane of said headliner.

13. The invention as set forth in claim 1 wherein said folded portion is of a generally triangular cross-sectional shape and includes first and second side sections diverging away from the plane of said headliner and a third side section extending between said first and second sides and arranged generally parallel to the plane of said headliner.

14. The invention as set forth in claim 7 wherein the adjacent edges of said headliner sections are generally parallel to one another.

15. The invention as set forth in claim 14 wherein said parallel edges are folded generally perpendicular to the plane of said headliner.

16. The invention as set forth in claim 14 wherein said parallel edges are folded parallel to the plane of said headliner.

17. The invention as set forth in claim 14 wherein a portion of each of said adjacent edges is arranged perpendicular to the plane of said headliner and another portion of each of said adjacent edges is arranged parallel to the plane of said headliner.

18. The invention as set forth in claim 1 wherein said material is scored adjacent said folded portion.

19. The invention as set forth in claim 18 wherein said score is in the form of an elongated score line formed on the side of said headliner confronting the interior of the vehicle.

20. The invention as set forth in claim 18 wherein said score is in the form of a score line formed on the side of said headliner opposite that confronting the interior of the vehicle.

21. The invention as set forth in claim 18 wherein said folded portion is folded along a score line in said material.

22. The invention as set forth in claim 21 which includes additional score lines formed in said material parallel to said score line along which said material is folded.

23. The invention as set forth in claim 1 wherein said folded portion is formed with at least one slit running transversely thereto to permit bending of said headliner in a direction generally perpendicular to said folded portion.

24. The invention as set forth in claim 23 wherein said folded portion extends transversely of said headliner and said slit extends longitudinally thereof.

25. The invention as set forth in claim 23 which includes a score line formed in said headliner and generally aligned with said slit.

26. The invention as set forth in claim 1 wherein said folded portion terminates adjacent one edge of said headliner, and wherein said edge is formed with a cut-away portion extending inwardly from the edge of said headliner and generally aligned with said folded portion to accommodate for curvature of the headliner upon assembly thereof.

27. The invention as set forth in claim 26 wherein said cut-away portion is of a generally V shape and includes converging sides which intersect at the center line of said folded portion.

28. The invention as set forth in claim 27 wherein said cut-away portion extends transversely of said headliner and which includes score lines extending longitudinally of said headliner.

29. The invention as set forth in claim 1 wherein said headliner comprises a single layer of a fibrous paper-like material.

30. The invention as set forth in claim 1 wherein said headliner comprises a laminated structure of at least two different materials, one of said materials comprising a substrate and the other of said materials comprising a covering medium.

31. The invention as set forth in claim 1 wherein said material has the side thereof confronting the interior of the vehicle textured.

32. The invention as set forth in claim 1 wherein said material has the side thereof confronting the interior of the vehicle colored.

33. The invention as set forth in claim 30 wherein said covering medium is textured.

34. The invention as set forth in claim 30 wherein said covering medium is colored.

35. The invention as set forth in claim 1 wherein said material comprises a lamination of at least two layers, with one of said layers comprising a moisture barrier.

36. The invention as set forth in claim 30 wherein said covering medium comprises a resilient deformable material.

37. The invention as set forth in claim 30 wherein said covering medium comprises a pile-like material.

38. The invention as set forth in claim 30 wherein one of said materials is perforated.

39. The invention as set forth in claim 30 wherein each of said materials are perforated.

40. The invention as set forth in claim 30 wherein each of said materials is folded at said folded portion of said headliner.

41. The invention as set forth in claim 30 wherein said substrate is folded and said covering medium extends over and conceals the line provided by the folded portion of said substrate.

42. The invention as set forth in claim 1 wherein said headliner comprises a lamination of multi-layers and wherein one of said layers comprises an insulating medium.

43. The invention as set forth in claim 30 wherein said covering medium is formed with a score line.

44. The invention as set forth in claim 30 wherein both said covering medium and substrate are formed with score lines.

45. The invention as set forth in claim 1 wherein said material is recessed to accommodate for a vehicle sunvisor.

46. The invention as set forth in claim 45 which includes a second member fabricated of a relatively resilient deformable material and having a recessed area the rein adapted to nestingly receive a vehicle sunvisor.

47. The invention as set forth in claim 1 which includes means retaining said folded portion of said headliner in a folded configuration.

48. The invention as set forth in claim 1 which includes an elongated relatively rigid member extending generally parallel to said folded portion of said headliner.

49. The invention as set forth in claim 48 wherein said rigid member comprises an inverted U-shaped channel defining an elongated recess adapted to nestingly receive at least part of said folded portion.

50. The invention as set forth in claim 7 which includes securing means for fixedly securing said adjacent edges to one another.

51. The invention as set forth in claim 50 wherein said securing means comprises first and second sections engageable with the opposite sides of the adjacent edges of said headliner sections.

52. The invention as set forth in claim 51 which includes means extending between said engageable sections.

53. The invention as set forth in claim 52 wherein said means extending between said sections comprises projection means on one of said sections, and wherein the other of said sections includes projection receiving means.

54. The invention as set forth in claim 53 wherein said projection means extends through said adjacent edges of said headliner.

55. The invention as set forth in claim 54 wherein said projection means is formed integrally of one of said sections and wherein said projection receiving means includes portions of the other of said sections adapted for engagement with said projection means.

56. The invention as set forth in claim 7 which includes means for fixedly securing said adjacent edges together, said securing means including first and second clamping sections.

57. The invention as set forth in claim 56 which includes projection means on one of said clamping sections and projection receiving means on the other of said clamping sections.

58. The invention as set forth in claim 48 wherein said rigid member comprises a thin rod-like element.

59. The invention as set forth in claim 58 wherein said rod-like element extends through a loop-shaped member on the side of said headliner opposite that confronting the interior of the vehicle.

60. The invention as set forth in claim 59 wherein said loop-shaped member is formed by said folded portion of said headliner.

61. The invention as set forth in claim 58 wherein said rod-like member comprises first and second rod sections.

62. The invention as set forth in claim 61 which includes coupling means for operatively connecting adjacent ends of said rod sections.

63. The invention as set forth in claim 58 wherein said coupling means is disposed generally centrally of said headliner.

64. The invention as set forth in claim 1 which includes an elongated rod-like member extending perpendicular to said folded portion.

65. The invention as set forth in claim 64 wherein said rod-like member extends through said folded portion.

66. The invention as set forth in claim 48 wherein the vehicle roof includes a structural roof bow on the underside thereof and which includes connecting means on said rigid member engageable with said roof bow for at least partially supporting said headliner.

67. The invention as set forth in claim 66 wherein said rigid member comprises a channel-like member and wherein said connecting means is formed integrally of said rigid member.

68. The invention as set forth in claim 48 wherein said rigid member is slit transversely thereof to permit bending in order to conform with the shape of the associated roof.

69. The invention as set forth in claim 67 which includes engageable projection and projection receiving means for connecting said member to said roof bow.

70. The invention as set forth in claim 64 wherein said projection means is formed integrally of said rigid member.

71. The invention as set forth in claim 49 which includes securing teeth on said channel adapted for engagement with said folded portion.

72. The invention as set forth in claim 48 wherein the opposite ends of said rigid member are adapted for engagement with the longitudinally extending lateral roof rails of the associated vehicle roof.

73. A vehicle headliner construction adapted to be mounted adjacent the underside of a vehicle roof,
said headliner comprising a first member fabricated of relatively rigid but foldable material,
a second member adapted to be oriented adjacent said first member, and
the adjacent edges of said first and second members forming a seam line on the side of the headliner confronting the interior of the vehicle,
one of said first members having a portion thereof reversely folded and providing a line similar in appearance to said seam line.

74. The invention as set forth in claim 73 wherein said lines are parallel.

75. The invention as set forth in claim 74 wherein said lines extend laterally of said headliner between the longitudinal side edges thereof.

76. The invention as set forth in claim 74 wherein said lines extend longitudinally between the forward and rearward edges of said headliner.

77. The invention as set forth in claim 73 wherein both of said members are fabricated of a rigid foldable material.

78. The invention as set forth in claim 73 wherein one of said members is fabricated of a resilient deformable polymeric material.

79. The invention as set forth in claim 73 wherein said folded portion comprises a pair of adjacently oriented substantially parallel side sections.

80. The invention as set forth in claim 79 wherein said side sections are arranged perpendicular to the plane of said headliner.

81. The invention as set forth in claim 79 wherein said side sections are arranged generally parallel to the plane of said headliner.

82. The invention as set forth in claim 79 wherein a portion of each of said side sections is arranged perpendicular to the plane of said headliner and another portion of each of said side sections is arranged parallel to the plane of said headliner.

83. The invention as set forth in claim 73 wherein said folded portion is of a generally triangular cross-sectional shape and includes first and second sides diverging away from the plane of said headliner and a third side extending between said first and second sides and arranged generally parallel to the plane of said headliner.

84. The invention as set forth in claim 73 wherein the adjacent edges of said members are generally parallel to one another.

85. The invention as set forth in claim 84 wherein said parallel edges are folded generally perpendicular to the plane of said headliner.

86. The invention as set forth in claim 84 wherein said parallel edges are folded parallel to the plane of said headliner.

87. The invention as set forth in claim 84 wherein a portion of each of said adjacent edges is arranged perpendicular to the plane of said headliner and another portion of each of said adjacent edges is arranged parallel to the plane of said headliner.

88. The invention as set forth in claim 73 which includes a score line adjacent said seam line.

89. The invention as set forth in claim 88 wherein said score line is formed on the side of said headliner confronting the interior of the vehicle.

90. The invention as set forth in claim 88 wherein said score line is formed on the side of said headliner opposite that confronting the interior of the vehicle.

91. The invention as set forth in claim 88 wherein said member is folded along said score line.

92. The invention as set forth in claim 91 which includes at least one score line in addition to said score line adjacent said seam line.

93. The invention as set forth in claim 73 wherein said folded portion is formed with at least one slit running transversely thereto to permit bending of said headliner in a direction generally perpendicular to said folded portion.

94. The invention as set forth in claim 93 wherein said folded portion extends transversely of said headliner and said slit extends longitudinally thereof.

95. The invention as set forth in claim 93 which includes a score line formed in said headliner and generally aligned with said slit.

96. The invention as set forth in claim 73 wherein said folded portion terminates adjacent one edge of said headliner, and wherein said edge is formed with a cut-away portion extending inwardly from the edge of said headliner and generally aligned with said folded portion to accommodate for curvature of the headliner upon installation thereof.

97. The invention as set forth in claim 96 wherein said cut-away portion is of a generally V shape and includes converging sides which intersect at the center line of said folded portion.

98. The invention as set forth in claim 97 wherein said cut-away portion extends transversely of said headliner and which includes score lines extending longitudinally of said headliner.

99. The invention as set forth in claim 73 wherein one of said members is fabricated of a single layer of a fibrous paper-like material.

100. The invention as set forth in claim 73 wherein one of said members comprises a laminated structure of at least two different materials, one of said materials comprising a substrate and the other of said materials comprising a covering medium.

101. The invention as set forth in claim 73 wherein said members have the sides thereof confronting the interior of the vehicle textured.

102. The invention as set forth in claim 73 wherein said members have the sides thereof confronting the interior of the vehicle colored.

103. The invention as set forth in claim 100 wherein said covering medium is textured.

104. The invention as set forth in claim 100 wherein said covering medium is colored.

105. The invention as set forth in claim 73 wherein one of said members comprises a lamination of at least two layers, with one of said layers comprising a moisture barrier.

106. The invention as set forth in claim 100 wherein said covering medium comprises a resilient deformable material.

107. The invention as set forth in claim 100 wherein said covering medium comprises a pile-like material.

108. The invention as set forth in claim 100 wherein one of said members is perforated.

109. The invention as set forth in claim 100 wherein each of said members is perforated.

110. The invention as set forth in claim 100 wherein each of said materials is folded at said folded portion of said headliner.

111. The invention as set forth in claim 73 wherein one of said members is recessed to accommodate for a vehicle sunvisor.

112. The invention as set forth in claim 78 wherein said resilient member is formed with a recessed area therein adapted to nestingly receive a vehicle sunvisor.

113. The invention as set forth in claim 73 which includes an elongated relatively rigid member extending generally parallel to said folded portion of said headliner.

114. The invention as set forth in claim 113 wherein said rigid member comprises an inverted U-shaped channel defining an elongated recess adapted to nestingly receive at least part of said folded portion.

115. The invention as set forth in claim 73 which includes securing means for fixedly securing said adjacent edges to one another, said securing means including an elongated inverted U-shaped channel-like member adapted for telescopic engagement with said edges.

116. The invention as set forth in claim 113 wherein said rigid member comprises first and second cooperable clamping sections.

117. The invention as set forth in claim 116 which includes means extending between said clamping sections for fixedly securing the same to said folded portion.

118. The invention as set forth in claim 117 wherein said means extending between said sections comprises projection means on one of said sections, and wherein the other of said sections includes projection receiving means.

119. The invention as set forth in claim 118 wherein said projection means extends through said folded portion of said headliner.

120. The invention as set forth in claim 119 wherein said projection means is formed integrally of one of said sections and wherein said projection receiving means includes portions of the other of said sections adapted for engagement with said projection means.

121. The invention as set forth in claim 118 wherein said rigid member comprises a thin rod-like element.

122. The invention as set forth in claim 121 wherein said rod-like element extends through a loop-shaped member on the side of said headliner opposite that confronting the interior of the vehicle.

123. The invention as set forth in claim 122 wherein said loop-shaped member is formed by said folded portion of said headliner.

124. The invention as set forth in claim 121 wherein said rod-like member comprises first and second rod sections.

125. The invention as set forth in claim 124 which includes coupling means for operatively connecting adjacent ends of said rod sections.

126. The invention as set forth in claim 121 wherein said rod-like member extends through said folded portion.

127. The invention as set forth in claim 73 which includes means for fixedly securing said adjacent edges together, said securing means including first and second clamping sections.

128. The invention as set forth in claim 127 which includes projection means on one of said clamping sections and projection receiving means on the other of said clamping sections.

129. The invention as set forth in claim 113 wherein the vehicle roof includes a structural roof bow on the underside thereof and which includes connecting means on said rigid member engageable with said roof bow for at least partially supporting said headliner.

130. The invention as set forth in claim 129 wherein said rigid member comprises a channel-like member and wherein said connecting means is formed integrally of said rigid member.

131. The invention as set forth in claim 113 wherein said rigid member is slit transversely thereof to permit bending in order to conform with the shape of the associated roof.

132. The invention as set forth in claim 130 which includes engageable projection and projection receiving means for connecting said member to said roof bow.

133. The invention as set forth in claim 132 wherein said projection means is formed integrally of said rigid member.

134. The invention as set forth in claim 114 which includes securing teeth on said channel adapted for engagement with said folded portion.

135. The invention as set forth in claim 113 wherein the opposite ends of said rigid member are adapted for engagement with the longitudinally extending lateral roof rails of the associated vehicle roof.

136. A vehicle headliner construction adapted to be mounted adjacent the underside of a vehicle roof, said headliner comprising first and second members fabricated of relatively rigid foldable material arranged in generally side-by-side substantially coplanar relation and having adjacent edge portions folded out of the plane of said headliner, and connecting means engageable with said edge portions of said members for fixedly securing said members together, one of said members including a folded portion providing a seam appearing line on the side of the headliner confronting the interior of the vehicle.

137. The invention as set forth in claim 136 wherein said members provide a seam line at the joined adjacent edges thereof.

138. The invention as set forth in claim 136 wherein said seam appearing line and said seam extend parallel to one another.

139. The invention as set forth in claim 138 wherein said lines extend laterally of said headliner between the longitudinal side edges thereof.

140. The invention as set forth in claim 138 wherein said lines extend longitudinally between the forward and rearward edges of said headliner.

141. The invention as set forth in claim 136 wherein said folded edges are arranged perpendicular to the plane of said headliner.

142. The invention as set forth in claim 136 wherein said folded edges are arranged generally parallel to the plane of said headliner.

143. The invention as set forth in claim 136 wherein a portion of each of said edges is arranged perpendicular to the plane of said headliner and another portion of each of said edges is arranged parallel to the plane of said headliner.

144. The invention as set forth in claim 136 wherein said edges of said members are generally parallel to each other.

145. The invention as set forth in claim 136 wherein one of said members is scored adjacent said edge portions.

146. The invention as set forth in claim 145 wherein said score is in the form of an elongated score line formed on the side of said headliner confronting the interior of the vehicle.

147. The invention as set forth in claim 145 wherein said score is in the form of a score line formed on the side of said headliner opposite that confronting the interior of the vehicle.

148. The invention as set forth in claim 145 wherein said one member is folded along said score line.

149. The invention as set forth in claim 148 which includes additional score lines formed in said members parallel to said score line along which said one member is folded.

150. The invention as set forth in claim 136 wherein said folded edge portions are formed with at least one slit running transversely thereto to permit bending of said headliner in a direction generally perpendicular to said folded portion.

151. The invention as set forth in claim 150 wherein said folded portion extends transversely of said headliner and said slit extends longitudinally thereof.

152. The invention as set forth in claim 150 which includes a score line formed in said headliner and generally alinged with said slit.

153. The invention as set forth in claim 136 wherein said edge portions are cut away at the adjacent ends thereof to accommodate for curvature of the headliner upon installation thereof.

154. The invention as set forth in claim 153 wherein said cut-away portions of said adjacent edges form a generally V-shaped recess and includes converging sides which intersect at the seam between said members.

155. The invention as set forth in claim 154 wherein said cut-away portions extend transversely of said headliner and which include score lines extending longitudinally of said headliner.

156. The invention as set forth in claim 136 wherein one of said members comprises a single layer of a fibrous paper-like material.

157. The invention as set forth in claim 136 wherein each of said members consists of a laminated structure comprising a substrate and a covering medium.

158. The invention as set forth in claim 157 wherein said covering medium of said members is similar in appearance.

159. The invention as set forth in claim 157 wherein both said substrate and said covering medium are folded at said edges.

160. The invention as set forth in claim 137 wherein one of said members is recessed to accommodate for a vehicle sunvisor.

161. The invention as set forth in claim 160 wherein said one member is fabricated of a relatively resilient deformable material.

162. The invention as set forth in claim 137 which includes an elongated relatively rigid member extending generally parallel to said edge portions.

163. The invention as set forth in claim 162 wherein said rigid member comprises an inverted U-shaped channel defining an elongated recess adapted to nestingly receive at least part of said edge portions.

164. The invention as set forth in claim 137 wherein said means for securing said adjacent edge portions to one another includes an elongated inverted U-shaped channel-like member adapted for engagement with said edge portions.

165. The invention as set forth in claim 162 wherein said rigid member comprises first and second cooperable clamping sections.

166. The invention as set forth in claim 165 which includes means extending between said clamping sections for fixedly securing the same to said edge portions.

167. The invention as set forth in claim 166 wherein said means extending between said sections comprises projection means on one of said sections, and wherein the other of said sections includes projection receiving means.

168. The invention as set forth in claim 167 wherein said projection means extends through said edge portions of said headliner.

169. The invention as set forth in claim 168 wherein said projection means is formed integrally of one of said sections and wherein said project ion receiving means includes portions of the other of said sections adapted for engagement with said projection means.

170. The invention is set forth in claim 162 wherein the vehicle roof includes a structural roof bow on the underside thereof and wherein said connecting means is cooperable with said roof bow for at least partially supporting said headliner.

171. The invention as set forth in claim 170 wherein said connecting means comprises a channel-like member and which includes projection means cooperable with the roof bow.

172. The invention as set forth in claim 162 wherein said rigid member is slit transversely thereof to permit bending in order to conform with the shape of the associated roof.

173. The invention as set forth in claim 171 wherein said projection means is formed integrally of said channel-like member.

174. The invention as set forth in claim 163 which includes securing teeth on said channel adapted for engagement with said edge portions.

175. The invention as set forth in claim 162 wherein the opposite ends of said rigid member are adapted for engagement with the longitudinally extending lateral roof rails of the associated vehicle roof.

176. A vehicle headliner construction adatped to be mounted adjacent the underside of a vehicle roof,
said headliner comprising a sheet of a relatively rigid foldable material having a portion thereof folded out of the plane of the headliner so as to provide a seam appearing line on the side of said headliner confronting the interior of the vehicle, and
supporting means engageable with said portion of said headliner for securing the same to the underside of the associated vehicle roof.

177. The invention as set forth in claim 176 wherein said folded portion is located along one edge of said headliner.

178. The invention as set forth in claim 176 wherein said folded portion comprises a central part of said headliner material.

179. The invention as set forth in claim 176 wherein said material comprises said first and second headliner sections arranged adjacent one another, with confronting edges of said sections being folded out of the plane of said headliner and adapted for engagement with said support means.

180. The invention as set forth in claim 176 wherein said folded portion comprises a pair of adjacently oriented substantially paralle side sections.

181. The invention as set forth in claim 180 wherein said side sections are arranged perpendicular to the plane of said headliner.

182. The invention as set forth in claim 180 wherein said side sections are arranged generally parallel to the plane of said headliner.

183. The invention as set forth in claim 180 wherein a portion of each of said side sections is arranged perpendicular to the plane of said headliner and another portion of each of said side sections is arranged parallel to the plane of said headliner.

184. The invention as set forth in claim 176 wherein said folded portion is of a generally triangular cross-sectional shape and includes first and second sides diverging away from the plane of said headliner and a third side extending between said first and second sides and arranged generally parallel to the plane of said headliner.

185. The invention as set forth in claim 179 wherein said edges of said sections are generally parallel to one another.

186. The invention as set forth in claim 185 wherein said parallel edges are folded generally perpendicular to the plane of said headliner.

187. The invention as set forth in claim 185 wherein said parallel edges are folded parallel to the plane of said headliner.

188. The invention as set forth in claim 185 wherein a portion of each of said side sections is arranged perpendicular to the plane of said headliner and another portion of each of said side sections is arranged parallel to the plane of said headliner.

189. The invention as set forth in claim 176 wherein said support means is fabricated of a molded plastic material.

190. The invention as set forth in claim 176 wherein said supporting means comprises an inverted U-shaped channel defining an elongated recess adapted to nestingly receive at least part of said folded portion.

191. The invention as set forth in claim 176 wherein said supporting means comprises first and second cooperable clamping sections.

192. The invention as set forth in claim 191 which includes means extending between said clamping sections for fixedly securing the same to said folded portion.

193. The invention as set forth in claim 192 wherein said means extending between said sections comprises projection means on one of said sections, and wherein the other of said sections includes projection receiving means.

194. The invention as set forth in claim 193 wherein said projection means extends through said folded portion of said headliner.

195. The invention as set forth in claim 176 wherein said support means comprises a thin rod-like element.

196. The invention as set forth in claim 195 wherein said rod-like element extends through at least one aperture on the side of said headliner opposite that confronting the interior of the vehicle.

197. The invention as set forth in claim 196 wherein said aperture is formed in said folded portion of said headliner.

198. The invention as set forth in claim 196 wherein said rod-like member extends perpendicular to said folded portion.

199. The invention as set forth in claim 196 wherein said rod-like member extends perpendicular to said folded portion.

200. The invention as set forth in claim 196 wherein said rod-like member extends through said folded portion.

201. The invention as set forth in claim 176 wherein the vehicle roof includes a structural roof bow on the underside thereof and wherein said support means comprises an elongated relatively rigid member engageable with said roof bow for at least partially supporting said headliner.

202. The invention as set forth in claim 201 wherein said support means comprises a channel-like member and which includes connecting means formed integrally of said element and selectively engageable with the roof bow.

203. The invention as set forth in claim 201 wherein said rigid member is slit transversely thereof to permit bending in order to conform with the shape of the associated roof.

204. The invention as set forth in claim 203 wherein said connecting means comprises an upwardly extending projection on said channel-like member.

205. The invention as set forth in claim 176 wherein said supporting means includes at least in part magnet means secured to said material.

206. The invention as set forth in claim 205 wherein said layer of material is of a relatively rigid but foldable construction.

207. The invention as set forth in claim 206 wherein said magnet means is embedded in a layer of material laminated to said first mentioned layer of material.

208. The invention as set forth in claim 205 wherein said material comprises multi-laminated layers, and wherein said magnet means is connected to one of said layers other than the layer confronting the interior of the vehicle.

209. The invention as set forth in claim 48 wherein said rigid member extends generally parallel to said folded portion of said headliner and including projection means adapted to extend through said folded portion of said headliner for securing said folded portion against separation.

210. The invention as set forth in claim 48 wherein said rigid member is of a preformed configuration whereby when said folded portion of said headliner is secured thereto, portions of said headliner will assume the general curvature of said rigid member.

211. A vehicle headliner construction adapted to be mounted adjacent the underside of a vehicle roof,
    said headliner comprising a sheet of a relatively rigid foldable material having a portion thereof folded out of the plane of said headliner and projecting upwardly therefrom and providing an area of attachment connected integrally to said headliner but out of the general plane thereof, and
    an attachment element connectable to said area for at least partially retaining said headliner in its operative position within the associated vehicle.

212. A vehicle headliner construction adapted to be mounted adjacent the underside of a vehicle roof,
    said headliner comprising a sheet of a relatively rigid foldable material having a portion thereof folded and located on the side of the headliner confronting the roof of the associated vehicle,
    a relatively rigid stiffening member connected at least in part to said folded portion of said headliner and adapted to impart sufficient stiffness to said headliner so that the same will assume a predetermined operative position within the vehicle,
    said stiffening member being independent of and not connected to the side rails of the vehicle so as to serve the sole purpose of stiffening said headliner and not functioning to secure the same to the vehicle.

* * * * *

UNITED STATES PATENT AND TRADEMARK OFFICE
CERTIFICATE OF CORRECTION

PATENT NO. : 3,953,067
DATED : April 27, 1976
INVENTOR(S) : Richard A. Isola

It is certified that error appears in the above-identified patent and that said Letters Patent are hereby corrected as shown below:

Col. 1, line 28, "piect" should be --piece;

Col. 1, line 36, "headlinders" should be --headliners--;

Col. 1, line 43, "headlinders" should be --headliners--;

Col. 8, line 39, "relative" should be --relatively--;

Col. 14, line 25, "theh" should be --the--;

Col. 17, line 15, "adjacenly" should be --adjacently--;

Col. 17, line 15, "section" should be --sections--;

Col. 23, line 13, "the rein" should be --therein--;

Col. 27, line 11 (Claim 121) "118" should be --113--;

Col. 29, line 58, "is" should be --as--;

Col. 30, line 37, "paralle" should be --parallel--;

Col. 31, line 34, "perpendicular" should be --parallel--.

Signed and Sealed this

Ninth Day of November 1976

[SEAL]

Attest:

RUTH C. MASON
*Attesting Officer*

C. MARSHALL DANN
*Commissioner of Patents and Trademarks*